United States Patent
Tobin et al.

(10) Patent No.: US 10,021,890 B2
(45) Date of Patent: Jul. 17, 2018

(54) PROCESS AND SYSTEM FOR PREPARING DRY MILK FORMULA

(71) Applicant: N.V. Nutricia, Zoetermeer (NL)

(72) Inventors: John Tobin, Mitchelstown (IE); Jitti Chiaranaipanich, Voorschoten (NL); Rudolph Eduardus Maria Verdurmen, Utrecht (NL); Antonius Hendricus Janssen, Herpen (NL); Olivier Bertrand Rabartin, Amsterdam (NL); Raoul Charles Johan Moonen, Amersfoort (NL); Martijn Johannes Van Der Hoeven, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 199 days.

(21) Appl. No.: 14/782,140

(22) PCT Filed: Apr. 3, 2014

(86) PCT No.: PCT/NL2014/050203
§ 371 (c)(1),
(2) Date: Oct. 2, 2015

(87) PCT Pub. No.: WO2014/163494
PCT Pub. Date: Oct. 9, 2014

(65) Prior Publication Data
US 2016/0044933 A1    Feb. 18, 2016

(30) Foreign Application Priority Data

Apr. 3, 2013 (WO) ................ PCT/NL2013/050249

(51) Int. Cl.
*A23C 9/15*    (2006.01)
*A23C 9/142*    (2006.01)
(Continued)

(52) U.S. Cl.
CPC .......... *A23C 9/1512* (2013.01); *A23C 9/1422* (2013.01); *A23C 9/1425* (2013.01);
(Continued)

(58) Field of Classification Search
CPC ... A23C 9/1512; A23C 9/1422; A23C 9/1425; A23C 2210/252; A23L 33/19;
(Continued)

(56) References Cited

U.S. PATENT DOCUMENTS 4,268,528 A * 5/1981 Montigny .......... A23C 19/0285
426/36
4,497,836 A    2/1985 Marquardt et al.
(Continued)

FOREIGN PATENT DOCUMENTS

EP    1 133 238    9/2001
EP    1226759    * 7/2002
(Continued)

OTHER PUBLICATIONS

Pipe Fittings. Engineering 360. No date provided. http://www.globalspec.com/learnmore/flow_control_fluid_transfer/pipe_tubing_hose_fittings_accessories/pipe_fittings.*
(Continued)

*Primary Examiner* — Anthony Weier
(74) *Attorney, Agent, or Firm* — Gilberto M. Villacorta; Sunit Talapatra; Foley & Lardner LLP

(57) ABSTRACT

The invention relates to a process for treating animal skim milk and sweet whey and/or acid whey, having: (a) ultrafiltration (UF1) of a first liquid composition including animal skim milk with 70-90 wt % casein and 10-30 wt % whey proteins, based on total protein, over a first ultrafiltration membrane having a molecular weight cut-off of 2.5-25 kDa using a volume concentration factor of 1.5-6 to obtain a retentate (UFR1) and a permeate (UFP1); (b) ultrafiltration
(Continued)

(UF2) of a second liquid composition including sweet whey and/or acid whey over a second ultrafiltration membrane having a molecular weight cut-off of 2.5-25 kDa using a volume concentration factor of 2-15 to obtain a retentate (UFR2) and a permeate (UFP2); and (c) mixing the UF retentate originating from step (a) with the UF retentate originating from step (b) to obtain a mixture of UF retentates.

18 Claims, 2 Drawing Sheets

(51) Int. Cl.
| | |
|---|---|
| A23L 1/29 | (2006.01) |
| B01D 61/14 | (2006.01) |
| B01D 61/58 | (2006.01) |
| A23L 33/00 | (2016.01) |
| A23L 33/19 | (2016.01) |
| B01D 61/02 | (2006.01) |
| B01D 61/42 | (2006.01) |

(52) U.S. Cl.
CPC ............ *A23L 33/19* (2016.08); *A23L 33/40* (2016.08); *B01D 61/142* (2013.01); *B01D 61/58* (2013.01); *A23C 2210/252* (2013.01); *A23V 2002/00* (2013.01); *B01D 61/025* (2013.01); *B01D 61/027* (2013.01); *B01D 61/42* (2013.01); *B01D 2311/06* (2013.01); *B01D 2311/08* (2013.01); *B01D 2317/04* (2013.01)

(58) Field of Classification Search
CPC ....... A23L 33/40; B01D 61/142; B01D 61/58; B01D 61/025; B01D 61/027; B01D 61/42; B01D 2311/06; B01D 2311/08; B01D 2311/04; B01D 2317/04; A23V 2002/00
See application file for complete search history.

(56) References Cited

U.S. PATENT DOCUMENTS

| | | | |
|---|---|---|---|
| 4,518,616 A * | 5/1985 | Czulak | A23C 19/0285 426/40 |
| 5,118,516 A | 6/1992 | Shimatani et al. | |
| 5,169,666 A | 12/1992 | Woychik | |
| 5,503,865 A | 4/1996 | Behringer et al. | |
| 5,639,502 A | 6/1997 | Behringer et al. | |
| 6,440,222 B1 * | 8/2002 | Donovan | B01D 61/142 127/43 |
| 6,689,402 B1 * | 2/2004 | Nauth | A23C 19/0285 426/34 |
| 2002/0146500 A1 * | 10/2002 | Smith | A23C 9/1504 426/580 |
| 2007/0104847 A1 * | 5/2007 | O'Mahony | A23C 9/1422 426/582 |
| 2010/0215828 A1 * | 8/2010 | Tossavainen | A23C 3/033 426/583 |
| 2011/0281012 A1 | 11/2011 | Glas et al. | |
| 2013/0064923 A1 | 3/2013 | Remondetto et al. | |
| 2016/0044932 A1 * | 2/2016 | Tobin | A23C 9/1422 426/239 |

FOREIGN PATENT DOCUMENTS

| | | | |
|---|---|---|---|
| GB | 2404560 | * | 9/2005 |
| IE | 84134 | * | 2/2006 |
| WO | WO 96/08155 A1 | | 3/1996 |
| WO | WO-00/30461 A1 | | 6/2000 |
| WO | WO 01/93689 A1 | | 12/2001 |
| WO | WO-2008/077071 A1 | | 6/2008 |
| WO | WO-2011/051557 A1 | | 5/2011 |
| WO | WO 2012/110705 A1 | | 8/2012 |

OTHER PUBLICATIONS

International Search Report issued in International Patent Application No. PCT/NL2014/050202 dated Jun. 10, 2014.
International Search Report issued in International Patent Application No. PCT/NL2014/050203 dated Jul. 7, 2014.

* cited by examiner

PROCESS AND SYSTEM FOR PREPARING DRY MILK FORMULA

CROSS-REFERENCE TO RELATED APPLICATIONS

This application is the National Phase of International Patent Application No. PCT/NL2014/050203, filed Apr. 3, 2014, published on Oct. 9, 2014 as WO 2014/163494 A1, which claims priority to International Patent Application No. PCT/NL2013/050249, filed Apr. 3, 2013. The contents of which are herein incorporated by reference in its entirety.

FIELD OF THE INVENTION

The present invention relates to an advanced process for the manufacture of dairy products, preferably for the manufacture of dry milk formulae such as infant milk formulae and other nutritional products for infants, as well as to intermediary products obtainable by said process, uses of said intermediary products and a system for implementing said process.

BACKGROUND OF THE INVENTION

Human milk is considered the 'golden standard' for infant nutrition. Processing animal milk, for example cows' milk, to more resemble the composition of human milk is known in the art. Such processing is known in the art as 'humanizing' animal milk. The process of humanizing animal milk involves changing the ratio of casein:whey proteins as found in animal milk (e.g. approximately 80:20 for cow's milk) to the desired ratio for infant nutrition, as found in human milk (preferably between 75:25 and 30:70). In addition, the mineral content of animal milk is typically higher that the content found in human milk. Thus humanization of animal milk requires the reduction of the mineral content.

Preparation of products suitable for use in infant nutrition typically involves blending of various individually purified components in the appropriate ratios, either wet or dry. Current manufacturing processes require multiple dairy ingredients from intermediate suppliers, including skim milk or a concentrate thereof (including skim milk powder), demineralised whey or a concentrate thereof (including demineralised whey powder), whey protein concentrates or isolates (normally as powders), and pure grade lactose (typically in powder form) to formulate a nutritionally balanced infant formula.

WO 96/08155 describes a process for treating skim milk for the manufacture of cheese and milk powders, wherein whey proteins are removed from skim milk by microfiltration and further treatment includes ultrafiltration.

U.S. Pat. No. 5,503,865 discloses a process for treating skim milk, comprising microfiltration or ultrafiltration. The permeate thereof may be demineralised by for example ion exchange and/or electrodialysis in order to make it suitable to be used in baby products.

U.S. Pat. No. 4,497,836 discloses a process wherein whey is subjected to ultrafiltration, and the permeate thereof is subjected to electrodialysis or ion exchange.

WO 2001/93689 discloses a process wherein milk serum is subjected to ultrafiltration, and the permeate thereof is subjected to diafiltration. The ultrafiltration retentate is combined with the diafiltration retentate in the production of infant milk formulae, by mixing the combined product with milk powder.

EP 1133238 describes a process wherein animal milk is subjected to microfiltration through a membrane having a porosity of 0.1-0.2 micrometer, after which the microfiltration permeate comprising whey proteins is demineralised by electrodialysis. The mineral content of the electrodialyzed microfiltration permeate is very low, and subsequent fortification with minerals and trace elements is required to obtain an infant formula.

SUMMARY OF THE INVENTION

The inventors have designed an improved method for the production of dairy products, in particular for the production of dry (milk) powders, preferably dry (milk) powders for use in nutritional infant formulations, in which process more optimal use is made of filtration and separation technologies. In this process, a first liquid composition comprising 70-90 wt % casein and 10-30 wt % whey proteins, based on total protein, preferably animal skim milk, and a second liquid composition comprising sweet whey and/or acid whey are first subjected to separation by ultrafiltration, thereby reducing the need for (significant) polyvalent and/or monovalent ion removal from the casein and/or whey protein containing liquid compositions. The present invention thus preferably relates to a process for treating animal skim milk and whey, comprising the steps of ultrafiltrating animal skim milk and ultrafiltrating whey, preferably combined with softening and removal of monovalent ions of the lactose enriched ultrafiltration permeate streams and combining the obtained permeate and retentate streams.

Present day manufacturers of dry powder (infant) nutritional compositions largely rely on supply and use of highly purified ingredients, such as purified lactose, demineralized whey proteins and casein proteins to produce said compositions by mixing said ingredients. The present inventors have designed a process of treating animal skim milk and whey for manufacturing a dry (milk) powder that largely circumvents buying such high-grade, pure ingredients from third parties. The advantages of the present process of the invention over such existing methods of producing dry (milk) powders are numerous; e.g. the loss in lactose during the processing of skim milk and whey is reduced, complications related to fouling of membranes are reduced, the use of (externally added) chemicals is reduced and waste water is recycled in the process to a large extent and thus overall the process has a lower environmental impact. More in particular, whereas lactose yield in conventional purification methods for the production of nutritional powders lies around 83-85%, yield can be improved to over 90% in the process of the present invention.

More in particular, the present invention relates to a process for treating animal skim milk and whey, preferably for the manufacture of a dry powder, such as a dry powder that can be further processed into an infant milk formula and other nutritional products for infants. The present process involves ultrafiltration of animal skim milk and ultrafiltration of whey followed by mixing of the ultrafiltration retentates, which are enriched in milk proteins and whey proteins respectively. Adding whey to animal skim milk alters the protein composition of the skim milk, allowing the humanizing of skim milk to more resemble the protein composition of human milk. Both animal skim milk and whey typically contain too high levels of polyvalent ions, the content of which needs to be reduced in order to make the animal skim milk a suitable source of nutrients that can be used for feeding human infants.

The process according to the present invention employs ultrafiltration for the removal of said polyvalent ions from animal skim milk and whey. As such, neither the animal skim milk nor whey need to be softened to the extent which is ordinarily done in the art. The process according to the invention circumvents the need for using (significantly) softened and/or demineralized whey proteins for the manufacture of dry powder formulations that are suitable for infant nutrition preparation, by ultrafiltration of animal skim milk and whey. In an especially preferred embodiment, the lactose that is removed from both the skim milk and whey as ultrafiltration permeate is softened or even demineralized, meaning the amounts of polyvalent ions and monovalent ions is reduced compared to the incoming material, after which the permeate is used to supplement the resulting dry powder formulations, by adding the demineralized lactose to either before, during or after mixing of the ultrafiltration retentates. As such, the mineral content of the resulting formulae is sufficiently low to enable infant nutrition preparation according to regulatory bodies (e.g. EU directive 91/321/EEC or EU directive 2006/141/EC, US Food and Drug Administration 21 CFR Ch 1 part 107).

More in particular, the present invention relates to a process for treating animal skim milk and sweet whey and/or acid whey, comprising:

(a) ultrafiltration (UF1) of a first liquid composition comprising animal skim milk with 70-90 wt % casein and 10-30 wt % whey proteins, based on total protein, over a first ultrafiltration membrane having a molecular weight cut-off of 2.5-25 kDa using a volume concentration factor of 1.5-6 to obtain a retentate (UFR1) and a permeate (UFP1);

(b) ultrafiltration (UF2) of a second liquid composition comprising sweet whey and/or acid whey over a second ultrafiltration membrane having a molecular weight cut-off of 2.5-25 kDa using a volume concentration factor of 2-15 to obtain a retentate (UFR2) and a permeate (UFP2); and (c) mixing the UF retentate originating from step (a) with the UF retentate originating from step (b) to obtain a mixture of UF retentates.

In alternative wording, the present invention relates to a process for treating animal skim milk and sweet whey and/or acid whey, comprising:

(a) ultrafiltration (UF1) of a first liquid composition comprising animal skim milk with 70-90 wt % casein and 10-30 wt % whey proteins, based on total protein, over a first ultrafiltration membrane having a molecular weight cut-off of 2.5-25 kDa to obtain a retentate (UFR1) comprising 35-65 wt % proteins and 20-50 wt % lactose, based on dry weight, and a permeate (UFP1) comprising 0-5 wt % proteins and 70-98 wt % lactose, based on dry weight;

(b) ultrafiltration (UF2) of a second liquid composition comprising sweet whey and/or acid whey over a second ultrafiltration membrane having a molecular weight cut-off of 2.5-25 kDa to obtain a retentate (UFR2) comprising 15-55 wt % proteins and 35-65 wt % lactose, based on dry weight, and a permeate (UFP2) comprising 0-5 wt % proteins and 70-98 wt % lactose, based on dry weight; and (c) mixing the UF retentate originating from step (a) with the UF retentate originating from step (b) to obtain a mixture of UF retentates.

In a preferred embodiment, the process of the invention further comprises:

(d) removing polyvalent ions from the UF permeate originating from step (a), and/or from the UF permeate originating from step (b) or from a mixture of the UF permeates originating from step (a) and (b), to obtain a softened UF permeate, and (e) mixing a softened UF permeate from (d) with a UF retentate originating from step (a) and/or the UF retentate originating from step (b) or the mixture of UF retentates originating from step (c), preferably the mixture of UF retentates originating from step (c). Preferably, the UF permeate is obtained by one polyvalent ion removal step, wherein calcium, magnesium and phosphate are removed, preferably to a significant extent. Polyvalent ion removal preferably takes place by a combination of nanofiltration, salt precipitation, ultrafiltration and electrodialysis, most preferably following the sequence of nanofiltration, salt precipitation, ultrafiltration and electrodialysis.

In a preferred embodiment, the UF permeate originating from step (a) and the UF permeate originating from step (b) are combined or mixed in a volume ratio of between 10:1 and 1:20, preferably 5:1 and 1:15, more preferably 1:1 and 1:10, most preferably 1:2 and 1:6. Said combining or mixing can take place before or after softening, but preferably before softening.

In a preferred embodiment, mixing in step (c) involves mixing UFR1 and UFR2 in a volume ratio of between 20:1 and 1:20, preferably 10:1 and 1:10, more preferably 6:1 and 1:6, most preferably 3:1 and 1:3 or wherein the concentrated UFR1 (from step j1)) is combined or mixed with the concentrated UFR2 (from step (j1)) in a volume ratio of between 20:1 and 1:20, preferably 10:1 and 1:10, more preferably 6:1 and 1:6, most preferably 3:1 and 1:3.

In a preferred embodiment, the process of the invention further comprises:

(f) removing monovalent ions from at least one of the softened UF permeates of step (d), preferably before mixing in step (e). Preferably, the softened UF permeate is subjected to at most one or at most two monovalent ion removal steps, wherein sodium, chloride and potassium are removed, preferably to a significant extent. Preferably, all of the softened UF permeates of (d) are subjected to monovalent ion removal. Most preferably, the UF permeates of step (a) and (b) are first mixed into a single UF permeate composition which is subsequently softened and subjected to monovalent ion removal.

In a preferred embodiment, the process of the invention further comprises:

(g) subjecting at least one of the softened UF permeates of (d) to a concentration step, preferably by reverse osmosis and/or nanofiltration, preferably prior to mixing in step (e). Preferably, the UF permeates are subjected to at most one or at most two concentration steps.

In a preferred embodiment, removal of polyvalent ions is accomplished by electrodialysis, ion exchange and/or salt precipitation, and removal of monovalent ions is accomplished by nanofiltration or diafiltration. More preferably, polyvalent ion removal preferably takes place by a combination of nanofiltration, salt precipitation, ultrafiltration and electrodialysis, most preferably following the sequence of nanofiltration, salt precipitation, ultrafiltration and electrodialysis.

In a preferred embodiment, the process of the invention further comprises:

(h) drying of the UF retentate originating from step (a), the UF retentate originating from step (b) or the mixture of UF retentates originating from step (c), preferably after mixing with the softened UF permeate in step (a), to obtain a dry powder. Preferably, the UF retentate originating from step (a) and/or (b) or (c) is subjected to a concentration step and/or monovalent ion removal step prior to drying. This drying is step is preferably performed after mixing with the softened UFP1 permeate, which may be subjected to a monovalent ion removal step, the softened UFP2 permeate, which may be subjected to a monovalent ion removal step, or the softened UFP1/UFP2 combined permeate, which may be subjected to a monovalent ion removal step, to obtain a dry powder. In a preferred embodiment, the drying of step h) takes place after mixing step (e).

In a preferred embodiment, the drying takes place after mixing step (c). More preferably, drying involves drying of a softened UF permeate composition originating from steps (a) and (b) which is mixed with a UF retentate originating from (c) which UF retentate is subjected to monovalent ion removal and/or a concentration step. Most preferably, the UF retentate is subjected to monovalent ion removal and/or a concentration step prior to mixing them together, followed by mixing with the softened UF permeate composition which originates from steps (a) and (b).

In a preferred embodiment, the process of the invention further comprises:

(i) a heat-sterilization or pasteurization step of the mixture of UF retentates originating from step (c), preferably after step (e) and prior to step (h). Preferably, said heat-sterilization comprises a direct-steam injection (DSI) step.

In a preferred embodiment, the process of the invention further comprises:

(j1) monovalent ion removal and/or concentrating of the UF retentate originating from step (a) and/or the UF retentate originating from step (b), prior to step (c), (e) or (h), preferably by reverse osmosis and/or nanofiltration; or (j2) monovalent ion removal and/or concentrating of the mixture of UF retentates originating from step (c) prior to step (h), preferably by reverse osmosis and/or nanofiltration. Preferably, at least one or preferably all of the UF retentates of step (j1) or (j2) are subjected to at most one or at most two monovalent ion and/or concentration steps.

In a preferred embodiment, the mixture of UF retentates originating from step (c) is further processed into a nutritional product for providing nutrition to infants. In another preferred embodiment, further ingredients are added prior to, after or during step (c) or added prior to, after or during step (e), added prior to, after or during drying step (h). Such further ingredients preferably comprise (suitable amounts of) oils, vitamins, minerals, carbohydrates (such as lactose or maltodextrin where required), dietary fibers (such as galacto-oligosaccharides and/or fructo-oligosaccharides).

In a preferred embodiment, such an amount of the UF retentate originating from step (b) is mixed in step (c) with the UF retentate originating from step (b), that the mixture of UF retentates originating from step (c) is characterized by a casein to whey protein weight ratio between 75:25 and 30:70. Preferably this ratio lies between 70 to 30 and 36 to 64, more preferably between 65 to 35 and 45 to 55.

In a preferred embodiment, water which originates from a concentration step, preferably reverse osmosis and/or nanofiltration, performed on the UF retentate originating from step (a), the UF retentate originating from step (b), the mixture of UF retentates originating from step c), or from the UF permeate originating from step (a) and/or from the UF permeate originating from step (b) or the softened UF permeate, is added to the first liquid composition and/or the second liquid composition. Such a feed back of water usage stemming from a concentration step reduces the need for addition of external water supplies. Such water obtained from a concentration step can for example be used to reconstitute animal skim milk and/or whey powder into liquid compositions that can subsequently be subjected to ultrafiltration according to the invention.

In a preferred embodiment, the second liquid composition of step (b) comprises at least 50 wt % sweet whey of the total whey, on total weight basis, preferably at least 60 wt %, more preferably at least 70 wt % or 80 wt %, most preferably at least 90 wt %.

In a preferred embodiment, the invention relates to a process for treating animal skim milk and animal whey, for the manufacture of dairy products, preferably dry formulae, more preferably dry infant milk powders and other nutritional products for infants.

In a preferred embodiment, the process according to the invention preferably operates with 500-2500 kg, more preferably 800-1800 kg, most preferably 1000-1400 kg dry matter of the first liquid composition, preferably of animal skim milk, incoming per hour. The process according to the invention preferably operates with 1500-5000 kg, more preferably 2200-4000 kg, most preferably 2600-3000 kg dry matter of the second liquid composition, preferably of animal whey, incoming per hour. The process according to the invention preferably operates with 750-4000 kg, more preferably 1000-3000 kg, most preferably 1500-2000 kg UF retentate obtained per hour from the ultrafiltration of both incoming streams combined. The process according to the invention preferably operates with 1000-5000 kg, more preferably 1500-4000 kg, most preferably 2000-2500 kg UF permeate obtained per hour from the ultrafiltration of both incoming streams combined.

DETAILED DESCRIPTION OF THE INVENTION

Process According to the Present Invention

Figure 1:
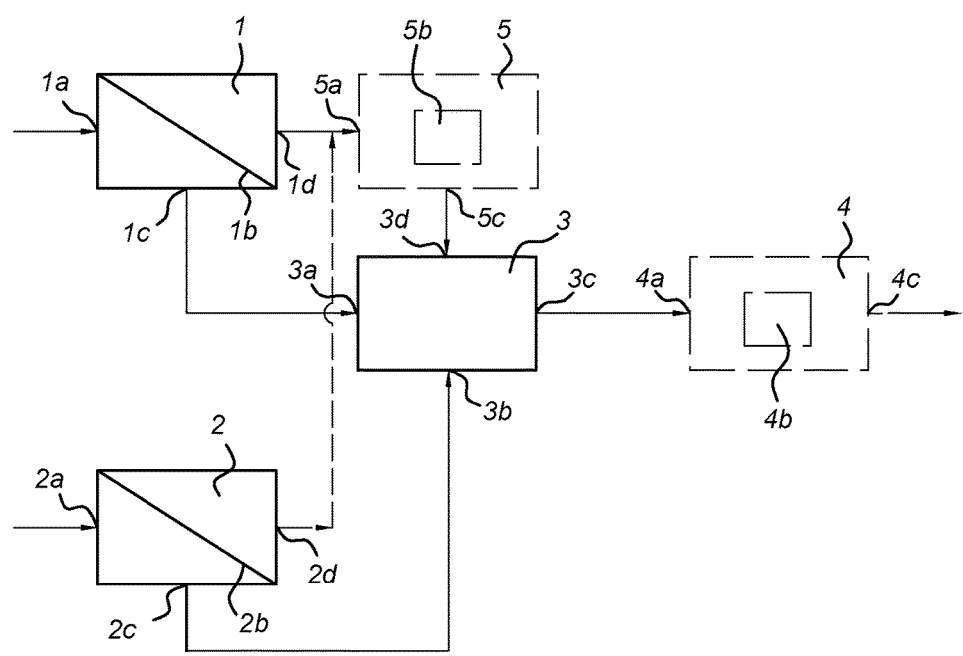
FIG. 1 and FIG. 2 depict several embodiments of the system according to the invention.
Figure 2:
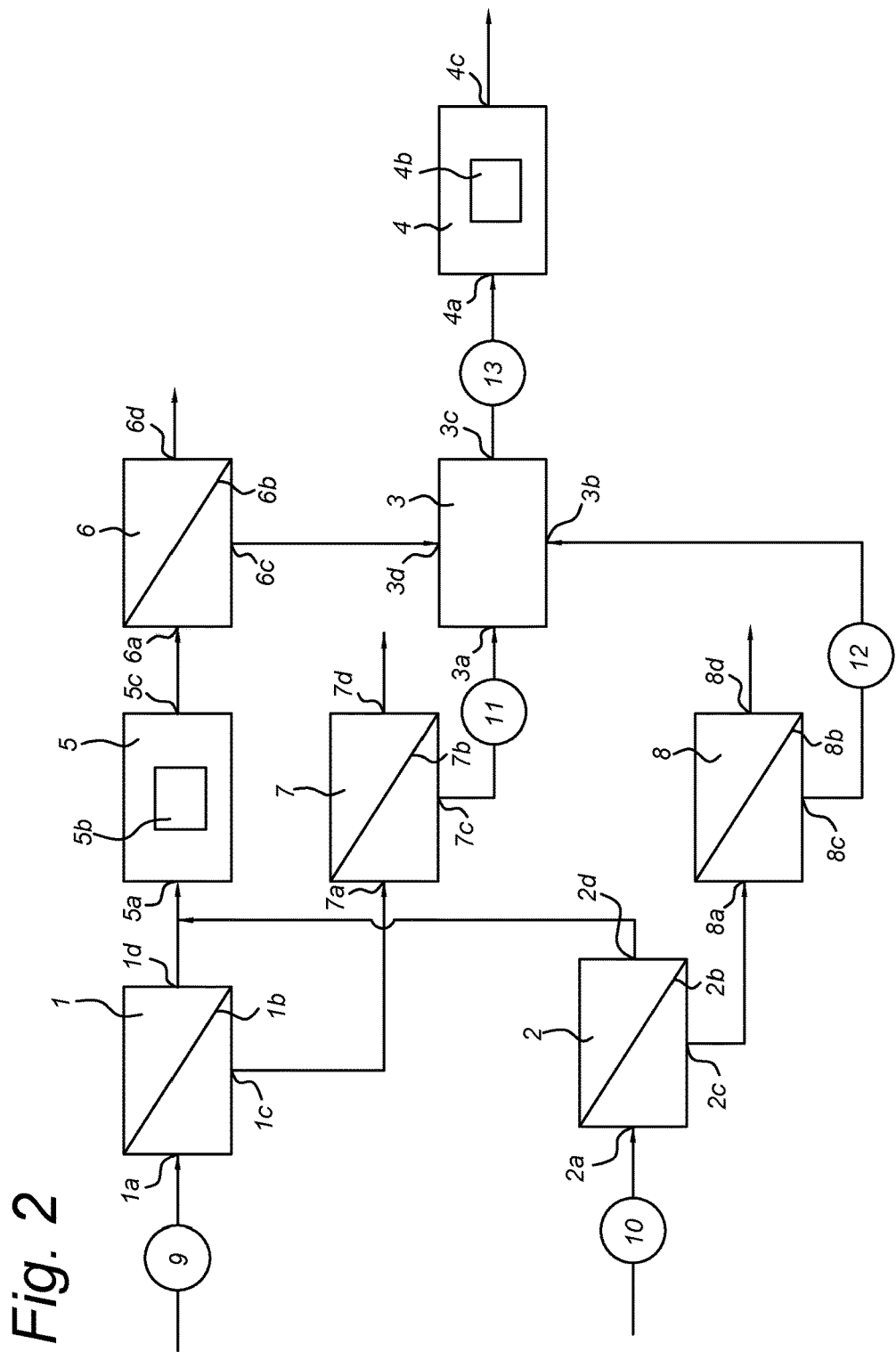

The present invention relates to a process for treating animal skim milk and sweet whey and/or acid whey, comprising:

(a) ultrafiltration (UF1) of a first liquid composition comprising animal skim milk with 70-90 wt % casein and 10-30 wt % whey proteins, based on total protein, over a first ultrafiltration membrane having a molecular weight cut-off of 2.5-25 kDa using a volume concentration factor of 1.5-6 to obtain a retentate (UFR1) and a permeate (UFP1);

(b) ultrafiltration (UF2) of a second liquid composition comprising sweet whey and/or acid whey over a second ultrafiltration membrane having a molecular weight cut-off of 2.5-25 kDa using a volume concentration factor of 2-15 to obtain a retentate (UFR2) and a permeate (UFP2); and (c) mixing the UF retentate originating from step (a) with the UF retentate originating from step (b) to obtain a mixture of UF retentates.

In alternative wording, the present invention relates to a process for treating animal skim milk and sweet whey and/or acid whey, comprising:

(a) ultrafiltration (UF1) of a first liquid composition comprising animal skim milk with 70-90 wt % casein and 10-30 wt % whey proteins, based on total protein, over a first ultrafiltration membrane having a molecular weight cut-off of 2.5-25 kDa to obtain a retentate (UFR1) comprising 35-65 wt % proteins and 20-50 wt % lactose, based on dry weight, and a permeate (UFP1) comprising 0-5 wt % proteins and 70-98 wt % lactose, based on dry weight;

(b) ultrafiltration (UF2) of a second liquid composition comprising sweet whey and/or acid whey over a second ultrafiltration membrane having a molecular weight cut-off of 2.5-25 kDa to obtain a retentate (UFR2) comprising 15-55 wt % proteins and 35-65 wt % lactose, based on dry weight, and a permeate (UFP2) comprising 0-5 wt % proteins and 70-98 wt % lactose, based on dry weight; and (c) mixing the UF retentate originating from step (a) with the UF retentate originating from step (b) to obtain a mixture of UF retentates.

The process according to the invention uses at least two sources of protein; the first is a liquid composition comprising animal skim milk with 70-90 wt % casein and 10-30 wt % whey proteins, based on total protein. Preferably, the first liquid composition comprises or is animal skim milk with a 80:20 casein to whey protein content ratio. Preferably, the second liquid composition comprises or is sweet whey and/or acid whey. More preferably the second liquid composition comprises or is sweet whey.

In the process according to the invention, the first liquid composition and the second liquid composition are each subjected to ultrafiltration (UF, steps (a) and (b)) to obtain two UF retentates (UFR1 and UFR2) and two UF permeates (UFP1 and UFP2). In a preferred embodiment, any of the first liquid composition, the second liquid composition and the mixture of UF retentates originating from UF of the first and second liquid compositions may be subjected to various processing steps before the final diary product is obtained.

In a preferred embodiment, the UFP1 permeate originating from step (a) is first mixed with the UFP2 permeate originating from step (b) (for example by collection in a single collection/storage tank) before removal of polyvalent ions in step (d) takes place. The softened UFP1/UFP2 combined permeate (i.e. the mixed UFP1/UFP2 permeate that originate from the UF1/UF2 step which contains reduced polyvalent ions levels) is subsequently mixed with the UFR1 retentate that originates from UF1, the UFR2 retentate that originates from UF2, or preferably with the mixture of UF retentates of step (c). In a more preferred option, the UFR1 retentate that originates from (a), the UFR2 retentate that originates from (b), or preferably the mixture of UF retentates of step (c) is first subjected to a concentration step, preferably by reverse osmosis or nanofiltration, after which these more concentrated liquid compositions is/are combined with the softened UFP1/UFP2 combined permeate. An advantage of first mixing the UFP1 permeate that originates from UF1 with the UFP2 permeate that originates from UF2 is that polyvalent ions are removed from a single liquid composition (i.e. the UFP1/UFP2 permeate mixture) instead of that removing polyvalent ions involves removal from two separate liquid compositions.

In yet another preferred embodiment, the process of the invention comprises step (j1) or (j2). Herein, preferably the UF retentate originating from step (a) and/or the UF retentate originating from step (b) is/are subjected to a monovalent ion removal and/or concentrating step, prior to step (c), (e) or (h), preferably by reverse osmosis and/or nanofiltration. Preferably, said UF retentates are separately subjected thereto. Alternatively, the mixture of UF retentates originating from step (c) is subjected to monovalent ion removal and/or concentration thereof, prior to step (h), preferably by reverse osmosis and/or nanofiltration. Preferably, at least one or both of the UF retentates of step (a) and (b) or the UF retentate of step (c) is/are subjected to at most one or at most two monovalent ion and/or concentration steps.

In another preferred embodiment, the UFR1 retentate originating from UF1 is enriched in casein and whey proteins, the UFR2 retentate originating from UF2 is enriched in whey proteins, the mixture of UF retentates of step (c) is enriched in casein and whey protein, the UFP1 and UFP2 permeates originating from UF1 and UF2, respectively, are enriched in lactose. Furthermore, the mixture of UF retentates of step (c) is characterized by a casein to whey protein ratio that is shifted from the 80:20 weight ratio as observed in cows' skim milk towards higher whey protein levels. Preferably, the casein protein to whey protein weight ratio thereof lies between 75 to 35 and 30 to 70.

The process according to the invention provides sufficient removal of polyvalent ions and preferably monovalent ions, by virtue of the ultrafiltration of step (a) and (b) and optionally the softening of step (d), so that all minerals are on or below their required level for infant nutrition. In case the content of a certain mineral is below the required level, preferably that mineral is added. As the level of phosphate and sodium are particularly high in animal skim milk, the process according to the invention is designed as such that the content of phosphate and sodium is sufficiently reduced to enable infant nutrition preparation. Other ions may be removed to a greater extent and preferably are supplemented again to the final product.

In a preferred embodiment, the present invention relate to a process for obtaining an infant formula, wherein, irrespective of the combining of the lactose in the softened UF permeate originating from step (d) with any of the UF retentates originating from step (a) and (b), additional supplementation of lactose may be desired to fulfill the requirements for infant nutrition.

Ultrafiltration Steps (a) and (b)

In the process according to the invention, the first and second liquid compositions are subjected to an ultrafiltration step (a) and (b), wherein the liquid and small solutes permeate through the membrane and end up in the UF permeate (UFP1/UFP2), while the UF retentate (UFR1/UFR2) comprise substantially all protein, in a reduced volume when compared to the incoming liquid composition.

Ultrafiltration is readily performed using any ultrafiltration means known in the art, including ceramic membranes, tubular and organic spiral wound membranes, preferably the UF membrane is an organic spiral wound membrane. The UF membranes employed have a molecular weight cut-off (MWCO) of that enables proteins (e.g. whey proteins and casein) to remain in the retentate, and small solutes (e.g. solutes having a molecular weight of at most 25 kDa, preferably at most 10 kDa) to permeate through the membrane. Preferably, UF is performed with a UF membrane having a MWCO of at most 25 kDa, more preferably at most 10 kDa, and preferably of at least 2.5 kDa, more preferably at least 5 kDa. UF of step (a) preferably operates with a volume concentration factor (VCF) of 1.5-6, more preferably 1.6-3, most preferably 1.7-2.5. UF of step (b) preferably operates with a VCF of 2-15, more preferably 3-10, most preferably 4-7. The UF is preferably performed below 40° C., more preferably between 3° C. and 30° C., even more preferably between 5° C. and 20° C., most preferably between 8 and 14° C.

Using such processing parameters, the UF retentate (UFR1) of step (a) typically comprises 35-65 wt %, preferably 40-60 wt % more preferable 45-55 wt % proteins, based on total dry weight of UFR1. Preferably, the protein content of UFR1 has not changed with respect to the incoming first liquid composition. Thus, it is preferred that UFR1 comprises 70-90 wt % casein and 10-30 wt % whey proteins, based on total protein. The UFR1 preferably has a total solid content of 5-20%, more preferably 8-17%, most preferably 10-15%. The UFR1 comprises lactose, preferably 20-50 wt % lactose, more preferably 30-42 wt % lactose. The UFR1 comprises monovalent ions and polyvalent ions. Typically, the UFR1 comprises 0.1-1 wt %, preferably 0.2-0.5 wt % sodium, 0.5-2.5 wt %, preferably 1.2-1.8 wt % potassium, 0.2-1.5 wt %, preferably 0.4-1 wt % chloride, 0.4-2.5 wt %, preferably 0.8-1.8 wt % phosphorus, 0.5-3 wt %, preferably 1.2-2 wt % calcium and 0.01-0.5 wt %, preferably 0.05-0.2 wt % magnesium, all based on total dry weight of UFR1. The total ash content of UFR1 is preferably 2-15 wt %, more preferably 6-10 wt %, based on total dry weight of UFR1.

Using such processing parameters, the UF permeate (UFP1) of step (a) typically comprises mainly lactose, preferably 70-98 wt % lactose, more preferably 80-92 wt % lactose. The UFP1 typically comprises 0-5 wt %, preferably 0-1 wt % proteins, based on total dry weight of UFP1. The UFP1 preferably has a total solid content of 2-15%, more preferably 3.5-10%, most preferably 4.5-6%. The UFP1 comprises monovalent ions and polyvalent ions. Typically, the UFP1 comprises 0.2-2 wt %, preferably 0.5-1 wt % sodium, 1-5 wt %, preferably 2-3.5 wt % potassium, 0.5-3.5 wt %, preferably 1.2-2.5 wt % chloride, 0.2-2.0 wt %, preferably 0.5-1.5 wt % phosphorus, 0.1-2 wt %, preferably 0.25-1 wt % calcium and 0.01-0.5 wt %, preferably 0.05-0.2 wt % magnesium, all based on total dry weight of the UFP1. The total ash content of UFP1 is preferably 4-17 wt %, more preferably 7-12 wt %, based on total dry weight of the UFP1. In a preferred embodiment, the VCF of the UF of step (a) is selected to produce a UFR1 and UFP1 with the characteristics as described above.

Using such processing parameters, the UF retentate (UFR2) of step (b) typically comprises 15-55 wt %, preferably 25-45 wt % more preferable 30-40 wt % whey proteins, based on total dry weight of UFR2. Preferably, the protein content of UFR2 has not changed with respect to the incoming second liquid composition. Thus, it is preferred that UFR2 comprises at most 10 wt %, preferably 0-2 wt % casein and at least 90 wt %, preferably 98-100 wt % whey proteins, based on total protein. The UFR2 preferably has a total solid content of 3-18%, more preferably 6-14%, most preferably 8-11%. The UFR2 comprises lactose, preferably 35-65 wt %, more preferably 45-55 wt % lactose. The UFR2 comprises monovalent ions and polyvalent ions. Typically, the UFR2 comprises 0.1-1.5 wt %, preferably 0.3-0.8 wt % sodium, 0.5-4 wt %, preferably 1.5-2.5 wt % potassium, 0.2-2.5 wt %, preferably 0.6-1.3 wt % chloride, 0.1-1.5 wt %, preferably 0.4-0.8 wt % phosphorus, 0.2-1.5 wt %, preferably 0.4-1 wt % calcium and 0.01-0.5 wt %, preferably 0.05-0.2 wt % magnesium, all based on total dry weight of UFR2. The total ash content of UFR2 is preferably 1-15 wt %, more preferably 5-9 wt %, based on total dry weight of UFR2.

Using such processing parameters, the UF permeate (UFP2) of step (b) typically comprises mainly lactose, preferably 70-98 wt % lactose, more preferably 80-92 wt % lactose. The UFP2 typically comprises 0-5 wt %, preferably 0-1 wt % proteins, based on total dry weight of UFP2. The UFP2 preferably has a total solid content of 2-15%, more preferably 3.5-10%, most preferably 4.5-6%. The UFP2 comprises monovalent ions and polyvalent ions. Typically, the UFP1 comprises 0.2-2 wt %, preferably 0.5-1 wt % sodium, 1-5 wt %, preferably 2-3.5 wt % potassium, 0.5-3.5 wt %, preferably 1.2-2.5 wt % chloride, 0.2-2.0 wt %, preferably 0.5-1.5 wt % phosphorus, 0.1-2 wt %, preferably 0.25-1 wt % calcium and 0.01-0.5 wt %, preferably 0.05-0.2 wt % magnesium, all based on total dry weight of the UFP2. The total ash content of UFP2 is preferably 4-17 wt %, more preferably 7-12 wt %, based on total dry weight of the UFP2. In a preferred embodiment, the VCF of the UF of step (b) is selected to produce a UFR2 and UFP2 with the characteristics as described above.

The UFR1 and UFR2 having the above characteristics are especially suitable to be combined, as the combination renders a composition, having the majority of ingredients, especially the minerals (monovalent and polyvalent ions) on or below their required level for infant nutrition, for the preparation of a nutritional product suitable for providing nutrition to an infant, according to governmental regulations.

Both UFPs are rich in lactose, which is a valuable product for multiple purposes, for example it can optionally be reintroduced into the process at a later stage in a softened form which may also be subjected to a monovalent ion removal step. In an especially preferred embodiment, the lactose comprising UF permeate(s) is/are combined with the UF retentate originating from UF of step (a), with the UF retentate originating from UF of step (b) or with the a mixture of the UF retentates originating from UF of steps (a) and (b).

Mixing Step (c)

In the process according to the invention, the UF retentate originating from UF of step (a) is combined and/or mixed with the UF retentate originating from UF of step (b).

The (weight or volume) ratio in which the UF retentate originating from step (a), preferably comprising the protein material originating from animal skim milk, and the UF retentate originating from step (b), comprising whey proteins, are mixed is dependent on the protein composition of the incoming first liquid composition (e.g. animal milk is a nature product and the composition thereof may vary somewhat depending on seasons, or what the animals had been fed) but is mainly determined by the desired protein composition in the resulting dairy product. The skilled person is able to determine the protein composition and concentration of the incoming animal skim milk by methods known in the art, e.g. by the method according to FT001/IDF 20-3 (for total protein, N*6.38), IDF29-1/ISO17997-1:2004 (for casein) and FT003 (for whey, NCN, non-casein nitrogen*6.38).

In a preferred embodiment, the (weight or volume) ratio in which the UF retentate originating from step (a), is mixed or combined with the UF retentate originating from step (b) lies between 10:1 and 1:10, more preferably In a particularly preferred embodiment, the dry (milk) formula is further processed into a nutritional product for human infants such as infant formulae, weaning infant formulae, follow up milk or formulae, growing-up milk, toddler milk. In this respect, the resulting weight ratio of casein:whey protein after mixing of UF retentates originating from steps (a) and (b) is preferably between 75:25 and 30:70, more preferably between 70 to 30 and 36 to 64, more preferably between 65 to 35 and 45 to 55.

The mixing of step (c) may be performed on liquid streams; e.g. the liquid UF retentate originating from step (a) can be mixed with the liquid UF retentate originating from step (b), giving a liquid UF retentate mixture comprising casein and whey proteins. Alternatively, one or both of the UF retentates originating from step (a) and (b) are dried prior to the mixing of step (c), and a liquid and a solid composition are mixed (e.g. by dissolving the solid in the liquid), giving a liquid mixed stream, or two solid streams are mixed (by dry blending), giving a solid mixed stream. In case drying is performed prior to mixing, it is preferred that both the skim milk UFR1 retentate stream and the retentate stream of the mixture comprising casein, sweet whey and/or acid whey are dried prior to mixing, and the resulting solids are dry blended. Preferably, the dried streams are powders. In an especially preferred embodiment, both retentate streams are liquid during mixing and the drying step is performed on the mixed retentate stream after the mixing step.

The mixing of step (c) may be accomplished by any means known in the art, such as "in pipe" (i.e. by the joining of two incoming pipes into one single outgoing pipe), in a (balance) tank or vessel, in an agitated vessel or by any industrial mixer or blender known in the art. In case two liquid streams are mixed, dynamic mixing or static mixing may be employed. In case two dried streams (e.g. two powders) are mixed, a dry blender such as a ribbon blender, a paddle blender, a tumble blender and a vertical blender, may be employed. Preferably, the mixing step is performed on two liquid streams, preferably "in pipe" or in a balance tank. The ratio in which the UF retentate originating from step (a) is mixed with the UF retentate originating from step (b) is conveniently influenced by controlling the flow rate of the incoming compositions.

Optional Further Processing Steps on the UF Retentates Prior to or After Mixing of Step (c)

Prior to the mixing of step (c), each of the UF retentates obtained in step (a) and (b) may be subjected to further processing steps, more preferably each of the UF retentates obtained in step (a) and (b) are subjected to further processing steps, prior to subjecting them to mixing in step (c). Such further processing steps include, preferably are limited to, concentrating the liquid composition in step (g) (i.e. increasing the protein/water weight ratio, e.g. via (partial) evaporation or filtration techniques such as nanofiltration or reverse osmosis), drying the liquid composition in step (h), heat treatment in step (i) (e.g. pasteurization (such as HTST, ESL or UHT) or sterilization (dry heat or moist heat) and/or supplementation of additional water or other components. It is especially preferred that the optional further processing steps of each of the UF retentates obtained in step (a) and (b) are limited to concentrating the liquid composition in step (g) (i.e. increasing the protein/water weight ratio, e.g. via (partial) evaporation or filtration techniques such as nanofiltration or reverse osmosis).

In a preferred embodiment, the UF retentates originating from step (a) and/or (b) or step (c) is/are concentrated in step (j1) and (j2), respectively, using reverse osmosis (RO) or nanofiltration (NF), preferably nanofiltration, prior to the executing step (c), (e) and/or (h). The concentration of step (j1) is typically performed over an NF membrane having a molecular weight cut-off of at most 500 Da, preferably at most 300 Da, and of at least 100 Da, preferably at least 150 Da, and typically operates with a VCF of 1.5-5, preferably 1.8-3. Alternatively, the VCF of the NF of step (j1) is preferably chosen as such, that the NFR has a total solid content of 5-30%, more preferably 10-25%, most preferably 16-20%.

The concentration of step (j1) is preferably performed below 40° C., more preferably between 3° C. and 30° C., even more preferably between 5° C. and 20° C. Nanofiltration may be enhanced with diafiltration, i.e. at least once an additional volume of water is added to the thus treated permeate, and this diluted permeate is subjected to NF again.

The NF or RO retentate, preferably the NF retentate, of the concentration of step (j1) of the animal skim milk composition originating from step (a) is a liquid composition typically comprising 30-75 wt % proteins (preferably 40-65 wt %, more preferable 45-60 wt %), 20-50 wt % lactose (preferably 30-38 wt %), 0.1-0.5 wt % sodium (preferably 0.15-0.4 wt %), 0.3-2 wt % potassium (preferably 0.7-1.2 wt %), 0.01-0.5 wt % magnesium (preferably 0.05-0.2 wt %), 0.5-3 wt % calcium (preferably 1.2-2 wt %), 0.05-1 wt % chloride (preferably 0.1-0.4 wt %), 0.4-2.5 wt % phosphate (preferably 0.8-1.8 wt %), based on total dry weight of the composition, has a total ash content of preferably 2-13 wt %, more preferably 5-9 wt %, based on total dry weight of the composition, and has a total solid content of 5-30%, more preferably 10-25%, most preferably 16-20%.

The NF or RO retentate, preferably the NF retentate, of the concentration of step (j1) of the whey composition originating from step (b) is a liquid composition typically comprising 15-55 wt % proteins (preferably 25-45 wt %, more preferable 30-40 wt %), 35-65 wt % lactose (preferably 45-55 wt %), 0.1-1 wt % sodium (preferably 0.15-0.5 wt %), 0.3-2 wt % potassium (preferably 0.6-1 wt %), 0.01-0.5 wt % magnesium (preferably 0.05-0.2 wt %), 0.2-3 wt % calcium (preferably 1.2-2 wt %), 0.05-1 wt % chloride (preferably 0.1-0.4 wt %), 0.1-1.5 wt % phosphate (preferably 0.4-0.8 wt %), based on total dry weight of the composition, has a total ash content of preferably 1-13 wt %, more preferably 5-9 wt %, based on total dry weight of the composition, and has a total solid content of 5-30%, more preferably 10-25%, most preferably 16-20%.

In an especially preferred embodiment, both the UF retentate originating from step (a) and the UF retentate originating from step (b) are subjected to concentration step (j1) prior to the mixing of step (c) and the optionally drying of step (h). It is also possible to concentrate the mixture of UF retentates originating from step (c) in step (j2).

Preferably, the UF retentate originating from step (a), (b) and/or (c) is/are not subjected to a polyvalent ion removal step after ultrafiltration. Preferably, these UF retentates are not subjected to electrodialysis, ion exchange and/or salt precipitation since a sufficient amount of the polyvalent ions are diverted into the UF permeates.

At least one of the UF retentates obtained in step (a), (b) and/or (c), optionally after the concentration of steps (j1) or (j2), may also be dried in step (h) prior to the mixing of step (c). As such, the UF retentate originating from step (a) and the UF retentate originating from step (b) are each dried separately, both preferably into a powder. Alternatively, drying may also occur prior to the mixing of step (c) on only one of the UF retentates, after which the dried UF retentate, preferably in the form of a powder, is mixed with the non-dried UF retentate. In the latter case, an additional drying step is preferably needed to dry the mixture of the UF retentates originating from step (c) in order to obtain a dry (milk) formula.

In a preferred embodiment, the mixture of UF retentates originating from step (c) are dried in step (h), and each of the UF retentate originating from step (a) and the UF retentate originating from step (b) are not dried prior to the mixing of step (c). Preferably, the drying of step (h) dries the mixture of UF retentates originating from step (c) into a powder, preferably by spray-drying. When the drying of step (h) occurs after the mixing of step (c), the least amount of drying steps is required; namely only involving the mixture of UF retentates originating from step (c).

As alternative to drying, the mixture of UF retentates originating from step (c) may remain liquid, optionally after concentration and/or dilution. This liquid mixed product may also be further processed into liquid nutritional products, preferably products suitable for feeding infants, e.g. as ready-to-use infant formulae.

After the mixing of step (c) and optionally the drying of step (h), the process according to the invention yields a dairy product, preferably a dry (milk) formula, preferably in the form of a powder. Preferably, this dry (milk) formula is further processed into a nutritional product suitable for providing nutrition to a human infant, in particular an infant between 0 and 36 months of age. Further processing typically comprises addition of further ingredients as known in the art to the dairy product, in particular one or more selected from vitamins, minerals, lipids, prebiotics, probiotics, lactose. Where appropriate, those ingredients may also be added to a liquid composition (either prior to the drying of step (h), or in case no drying step is performed), such as any of the UF retentate originating from step (a) and (b) and optionally to the softened UF permeate originating from step (d), or even to any of the incoming first and second liquid compositions. The skilled person is well aware of the beneficial ingredients for infant nutrition, and how they are best blended with the protein fraction.

The drying of step (h) may be accomplished by any means known in the art, e.g. spray drying, (fluidized) bed drying, drum drying, freeze drying, roller drying, etc. In an especially preferred embodiment, drying is accomplished using spray drying, optionally preceded by partial evaporation of the liquid (e.g. by nanofiltration, reverse osmosis, evaporation).

Optional Further Process Steps on the UF Permeates

Ultrafiltration of the first liquid composition in step (a) and of the second liquid composition in step (b) affords two ultrafiltration permeates (UFP1 and UFP2) that each comprise lactose. In a preferred embodiment, at least one of, preferably both of, these UF permeates is/are further processed and combined in step (e) with one of the UF retentates originating from step (a) or (b), or to the mixture of the UF retentates originating from step (c). The UF permeate originating from step (a) and from step (b) may be combined prior to further processing, or the further processing is performed on only one of the UF permeates, or each of the permeates separately. Preferably, the UF permeates originating from step (a) and (b) are first combined, after which the combined UF permeates, which are referred to as the "combined UFP1/UFP2" is further processed as described herein.

Preferably, the UF permeate originating from step (a), (b) and/or the combined UFP1/UFP2, has undergone further treatment before it is mixed with the UF retentate originating from step (a) and/or (b), or the mixture or UF retentates originating from step (c). Such further treatment preferably comprises subjecting any of these permeates to softening or polyvalent ion removal in optional step (d). Softening of any of the permeates affords a softened UF permeate. It is noted here that the "softened UF permeate" refers to a lactose comprising (preferably lactose enriched) composition that originates from the UF of step (a) and/or (b) as a permeate from which polyvalent and optionally monovalent ions have been removed e.g. by step (f).

Softening of at least one of the UF permeates originating from step (a) and/or (b) is preferably accompanied with or followed by the removal of monovalent ions. Removal of monovalent ions of at least one of the UF permeates originating from step (a) and/or (b) is especially preferred in case the dairy product obtained by the process according to the invention is further processed into a nutritional product suitable for infant nutrition.

Polyvalent ion removal, monovalent ion removal and/or concentration (e.g. step (d), (f), (g) and (j1)/(j2)) may be accomplished using any technique known in the art, such as electrodialysis, ion exchange, salt precipitation, lactose crystallization, membrane filtration techniques such as nanofiltration, optionally enhanced with diafiltration, or combinations thereof. In the context of the present invention, polyvalent ion removal, optionally combined with monovalent ion removal, also includes the crystallisation of lactose from a liquid UF permeate originating from step (a) and/or (b) and simultaneously keeping (significant amounts of) the polyvalent ions and preferably (significant amounts of) the monovalent ions in solution. The obtained crystalline lactose is regarded to be a softened UF permeate in the context of the present invention, as it originates from the UF of step (a) and has (significant amounts of) the polyvalent ions removed.

In an especially preferred embodiment, removal of polyvalent ions of step (d), removal of monovalent ions of step (f) and concentration of step (g) is performed by a combination of steps comprising nanofiltration, salt precipitation and precipitate removal. Preferably, this combination of steps also comprises electrodialysis. More preferably, removal of polyvalent ions is performed in the following order: nanofiltration, salt precipitation and precipitate removal. Preferably, the precipitate removal is followed by a further nanofiltration step (preferably enhanced with diafiltration) or by electrodialysis, most preferably it is followed by electrodialysis. Thus, it is preferred that the process of the invention involves the steps of subjecting the UF permeate originating from step (a), (b) and/or the combined UFP1/UFP2 to nanofiltration, subjecting the nanofiltration retentate to salt precipitation and subsequently removal of the precipitates therefrom (preferably by ultrafiltration), and subjecting the precipitate-depleted composition to electrodialysis (preferably enhanced with diafiltration).

Alternatively, it is preferred that the process of the invention involves the steps of subjecting the UF permeate originating from step (a), (b) and/or the combined UFP1/UFP2 to nanofiltration, subjecting the nanofiltration retentate to salt precipitation and subsequently removal of the precipitates therefrom (preferably by ultrafiltration), and subjecting the precipitate-depleted composition to a further nanofiltration step (preferably enhanced with diafiltration).

The step of subjecting the UF permeate originating from step (a), and/or of the UF permeate originating from step (b) or of a mixture of the UF permeates originating from step (a) and (b) to nanofiltration, as part of this embodiment, mainly accomplishes monovalent ion removal and concentration. Thus, nanofiltration may be regarded the monovalent ion removal of step (f) combined with the concentration of step (g). Nanofiltration is preferably performed using at least one NF membrane, more preferably at least one spiral wound membrane, wherein the membrane preferably has a molecular-weight cut-off of 10-600 Da, more preferably 100-400 Da, whereby the VCF is typically chosen such that the total solid content of the NF retentate is in the range of 15-35 wt %, preferably in the range of 20-25 wt %, most preferably about 22 wt %. NF is preferably operated at a VCF of 2-8, more preferably 3-6. NF of step (d1) is preferably performed below 40° C., more preferably in the range of 3° C.-30° C., even more preferably in the range of 5° C.-20° C.

The NF retentate is subsequently subjected to salt precipitation, which is mainly aimed at removal of polyvalent ions, in particular phosphate ions such as calcium phosphate. It is especially desirably to lower the phosphate content of the incoming animal skim milk and animal whey when the process of the invention is used to manufacture infant nutrition or a base for infant nutrition. The salt precipitation may thus be regarded as part of the polyvalent ion removal of step (d), and can be achieved by creating suitable conditions under which polyvalent ions precipitate from the lactose-enriched liquid. These conditions include addition of a strong base, such as sodium hydroxide, pH adjustment to a neutral pH, such as between 6 and 9, preferably between 6.8 and 9.0, and increasing the temperature to between 70 and 90° C., which is preferably followed by decreasing the temperature to between 5 and 30° C. Salt precipitation preferably is accomplished by heating the NF retentate to a temperature of 70° C.-90° C., preferably of 75° C.-88° C., most preferably of 80° C.-85° C. At such temperatures, at least part of the calcium phosphate precipitates, which is visible as a white precipitate. Higher temperatures are generally unsuitable, as they may cause undesirable enzymatic browning. Heating may occur by any means known in the art, and is preferably accomplished by steam injection into the NF retentate or by using a heat exchanger (e.g. a plate heat exchanger). Calcium phosphate precipitation may be enhanced, meaning that a greater fraction of the calcium phosphate precipitates, by increasing the pH of the heated NF retentate to a value above 6.5, preferably in the range of 6.8-9.0, more preferably in the range of 6.8-7.4, and/or by adding other calcium salts such as calcium chloride. The NF retentate typically has a pH of 6.0-6.5, and increasing this to above 6.5, preferably in the range of 6.8-9.0, more preferably in the range of 6.8-7.4, can be accomplished by addition of a base, preferably an aqueous solution of a metal hydroxide, such as sodium hydroxide, potassium hydroxide and/or calcium hydroxide. Preferably, a concentrated solution sodium hydroxide is used, more preferably a 20-35% (w/v) solution of NaOH in water. Only little of the base solution is needed, as the components that may act as buffer are removed by NF. As guidance, typically about 0.1-1 wt % based on the total weight of the NF retentate, preferably 0.3-0.5 wt % based on the total weight of the NF retentate, of a solution of about 30% (w/v) NaOH in water is used. The skilled person is capable to adjust this value for variations in pH of the NF retentate, different types of base and different concentrations. As the calcium content should not necessarily be reduced as much as the phosphate content of the UF permeate originating from step (a), and/or of the UF permeate originating from step (b) or of a mixture of the UF permeates originating from step (a) and (b), in order to prepare infant nutrition with both calcium and phosphate on or below desired values, some additional calcium, preferably in the form of calcium chloride, calcium citrate, calcium lactate, calcium hydroxide, or mixtures thereof, preferably calcium chloride, can be added to the heated NF retentate, which induces the precipitation of more calcium phosphate. Using calcium hydroxide preferably achieves both the pH increase and addition of a calcium salt, but its suitability is slightly hampered by its low solubility. Thus, in a preferred embodiment, a mixture of calcium chloride and sodium hydroxide is added to the NF retentate to enhance calcium phosphate precipitation. As such, the softened UFP will have a phosphate content which is further reduced compared to the calcium content. Suitably, the NF retentate is subsequently cooled to a temperature below 30° C., preferably in the range of 5° C.-30° C., more preferably in the range of 8° C.-25° C., most preferably in the range of 8° C.-15° C., before the precipitate is removed from the NF retentate. Rapidly cooling the NF retentate is especially preferred, to reduce the chances on undesirable bacterial growth and to minimize the resolubilization of calcium phosphate. Although less preferred, the precipitate may also be removed from the NF retentate at an elevated temperature, for example at a temperature above 25° C.

Subsequently, the precipitates may be removed by any technique known in the art (e.g. centrifugal separation, decantation in a settling tank, filtration, for example microfiltration or ultrafiltration). Preferably, the precipitate removal step is performed by filtration, more preferably by ultrafiltration, which permeates the lactose and soluble minerals and retains the precipitate which predominantly comprises calcium phosphate. The primary aim of this precipitate removal is thus to remove precipitates and not to fractionate any other material, and may thus be regarded as part of the polyvalent ion removal of step (d). Any UF membrane as known in the art may be used, but also a UF bed. Preferably, at least one UF membrane with a molecular-weight cut-off of preferably 1 kDa-50 kDa, more preferably 5-20 Da is used. UF preferably operates at a VCF of 5-40, more preferably 7-35, most preferably 10-30. Good results are obtained using a VCF of about 10, but lactose yields in the outflowing softened UFP may be further increased without deteriorating the efficacy of process by increasing the VCF to up to 40. Thus, the UF permeate comprises substantially all lactose as originally present in the incoming UF permeate(s) originating from step (a) and/or (b). The NF retentate which has been subjected to precipitate removal (e.g. the UF permeate) is referred to in the context of this embodiment as the precipitate-depleted UF permeate(s).

It is preferred that the resulting precipitate-depleted UF permeate(s) is/are further desalted in a further nanofiltration step and/or an electrodialysis step, most preferably in an electrodialysis step. The electrodialysis (ED) step as part of this embodiment may be regarded part of the polyvalent ion removal of step (d) and part of the monovalent ion removal of step (f), and is preferably performed on an incoming flow comprising between 18 and 24% w/w solids content. ED is preferably operated until the conductivity of the outflowing (lactose enriched) liquid reaches a value below 4 mS, preferably below 2 mS, even more preferably below 1 mS and/or until the ash content reaches a value of below 3 wt %, more preferably below 2 wt %, most preferably below 1 wt %, based on total weight of the outflowing liquid. The skilled person understands how to adjust the electrodialysis settings to achieve this goal. In case a further nanofiltration step is employed, NF is preferable conducted using the parameters (i.e. membrane type and porosity, VCF and temperature) as described above for the NF step on the incoming UF permeate(s) originating from step (a) and/or (b). Preferably, the NF is enhanced with diafiltration, i.e. at least once an additional volume of water is added to the NF permeate, and this diluted thus treated permeate is subjected to NF again. The NF is preferably performed such that the NF retentate has a total solid content of 16-28 wt %, preferably 18-22 wt %.

The resulting lactose-enriched outflowing liquid of this preferred sequence of steps for the combined removal of polyvalent ions of step (d), removal of monovalent ions of step (f) and concentration of step (g), i.e. the precipitate-depleted UF permeate (preferably obtained as a UF permeate) obtained in the precipitate removal step, the outflowing liquid obtained in the ED step or the NF retentate obtained in the further NF step, preferably the outflowing liquid of the ED step, is referred to as the softened UF permeate in step (d) and can be used in step (e).

The polyvalent ion removal of step (d) enables the removal of significant amounts of the polyvalent ions. Preferably at least 50 wt %, more preferably at least 70 wt % or at least 80 wt %, most preferably at least 90 wt % of the polyvalent ions are removed. The weight percentage (wt %) of polyvalent ion removal is determined by comparing the total weight of polyvalent ions present after step (b) to the total weight of polyvalent ions present prior to step (d).

Likewise, a monovalent ion removal step enables the removal of significant amounts of the monovalent ions. Preferably, at least 20 wt % of the monovalent ions are removed, more preferably at least 35 wt % or at least 50 wt %, most preferably at least 60 wt % of the monovalent ions are removed. Thus, the softened UF permeate preferably comprises at least 20 wt % less monovalent ions, preferably at least 35 wt % less, more preferably at least 50 wt % less, most preferably at least 60 wt % less monovalent ions, when compared to the incoming UF permeate originating from step (a).

Each of the UF permeates originating from the UF of step (a) and (b), either separately or as mixture, may undergo further processing steps prior to being subjected to the polyvalent ion removal of step (d). Such optional further processing steps include, preferably are limited to, concentrating the liquid stream (i.e. increasing the lactose/water weight ratio) by any suitable means known in the art (e.g. by (partial) evaporation or filtration techniques such as reverse osmosis), heat treatment (e.g. pasteurization (such as HTST, ESL or UHT) or sterilization (dry heat or moist heat)) and/or supplementation of additional water or other components. Concentration may also be accomplished during the removal of monovalent ions, e.g. during nanofiltration, optionally enhanced with diafiltration.

In an especially preferred embodiment, removal of monovalent ions from the UF permeate originating from step (a) and/or (b), or the combined UFP1/UFP2 is performed on any softened permeate originating from step (d) by nanofiltration (NF). Using this sequence of steps, the nanofiltration retentate (NFR) is considered to be the softened UF permeate (as this is enriched in lactose), which may then be combined with any of the UF retentates in step (e). During the ion exchange of step (d), the polyvalent ions (e.g. $Mg^{2+}$, $Ca^{2+}$, $PO_4^{3-}$) are replaced by monovalent ions (typically $Na^+$, $K^+$, $Cl^-$), and during nanofiltration these monovalent ions permeate through the nanofiltration membrane. Preferably, nanofiltration is enhanced with diafiltration, i.e. at least once an additional volume of water is added to this permeate, and this diluted thus treated permeate is subjected to NF again. Conveniently, the NF permeate which comprises monovalent ions and is substantially free of lactose, may be used to regenerate the ion exchange column(s).

Nanofiltration of the (softened) UF permeate originating from step (a) and/or step (b), or of the combined UFP1/UFP2, may be performed using a spiral wound membrane having a molecular weight cut-off of at most 500 Da, preferably at most 300 Da, and of at least 100 Da, preferably at least 150 Da, is used. The NF step typically operates with a VCF of 1.1-5, preferably 1.2-4, more preferably at 1.4 to 3. Alternatively, the VCF of the NF step is preferably chosen as such, that the NFR has a total solid content of 14-35%, more preferably 20-30%. The NF step is preferably performed below 40° C., more preferably between 3° C. and 30° C., even more preferably between 5° C. and 20° C.

Preferably, nanofiltration is enhanced with diafiltration. One or more additional volumes of water, typically 50-100 vol % of the volume of the incoming stream of the NF step (outgoing stream of the ion exchange step), preferably 60-80 vol %, are added to the NFR, which is subsequently pushed through the NF membrane together with residual monovalent ions from the NFR. Preferably, at least two additional volumes of water are added to the NFR. An additional advantage of using NF is that large amounts of water can be removed by this cost-effective membrane filtration technique, without the need for evaporation.

The composition of the UF permeate originating from step (a) and/or the UF permeate originating from step (b), or the composition of the combined UFP1/UFP2 may vary to a limited extent depending on the exact composition of the first liquid composition (e.g. what type of animal skim milk is used, which animal, seasonal variations). For example, new season bovine milk comprises somewhat higher levels of sodium compared to bovine milk from later in the season. Typically, the UF permeate originating from step (a) and/or the UF permeate originating from step (b), or the combined UFP1/UFP2 prior to softening is a liquid composition typically comprising 70-98 wt % lactose (preferably 80-92 wt %), 0.2-2 wt % sodium (preferably 0.5-1 wt %), 1-5 wt % potassium (preferably 2-3.5 wt %), 0.01-0.5 wt % magnesium (preferably 0.05-0.2 wt %), 0.1-2 wt % calcium (preferably 0.25-1 wt %), 0.5-3.5 wt % chloride (preferably 1.2-2.5 wt %), 0.2-2 wt % phosphorous (preferably 0.5-1.5 wt %), based on total dry weight of the composition, has a total ash content of preferably 4-17 wt %, more preferably 7-12 wt %, based on total dry weight of the composition, and preferably has a total solid content of 2-15%, more preferably 3.5-10%, most preferably 4.5-6%. In addition to lactose and minerals, the UF permeate originating from step (a) and/or the UF permeate originating from step (b), or the composition of the combined UFP1/UFP2 stream may comprise some small proteinaceous material (e.g. peptides), organic acids (e.g. citric acid, lactic acid) and non-protein nitrogen material (NPN).

After softening of step (d), the softened UF permeate, preferably comprises at least 90% of the lactose present prior to softening, preferably at least 95%. The softened UF permeate obtained after softening, or preferably after monovalent ion removal, most preferably after ion exchange of step (d) and subsequent nanofiltration, is a liquid composition typically comprising 75-100 wt % lactose (preferably 90-100 wt %, more preferable 95-99 wt %), at most 1.5 wt % sodium (preferably 0.2-0.7 wt %), at most 1 wt % potassium (preferably 0.1-0.5 wt %), at most 0.1 wt % magnesium (preferably at most 0.02 wt %), at most 0.2 wt % calcium (preferably at most 0.1 wt %), at most 1.5 wt % chloride (preferably 0.3-1 wt %), at most 0.5 wt % phosphate (preferably at most 0.3 wt %), based on total dry weight of the composition, has a total ash content of preferably at most 5 wt %, more preferably 1-4 wt %, based on total dry weight of the composition, and preferably has a total solid content of 7-35%, more preferably 10-30%, most preferably 18-28%. Each of the ions mentioned here is preferably substantially absent from these softened UF permeate after softening or monovalent ion removal.

In case the total solid content of any of the softened UF permeate is relatively low, e.g. below 10% or below 15%, the softened UF permeate may be concentrated to achieve a total solid content of preferably 10-30%, more preferably 18-28%, before being combined in step (e). Concentration may be accomplished by any means known in the art. Preferably, concentration is accomplished using reverse osmosis.

In case the softened UF permeate is obtained by ion exchange of step (d) and nanofiltration, the NF permeate is a liquid composition typically comprising at most 25 wt % lactose (preferably at most 15 wt %), 10-50 wt % sodium (preferably 20-30 wt %), 5-30 wt % potassium (preferably 8-12 wt %), 0-10 wt % magnesium (preferably 0.1-5 wt %), 0-10 wt % calcium (preferably 0.1-5 wt %), 20-70 wt % chloride (preferably 35-55 wt %), 0-10 wt % phosphate (preferably 0.1-5 wt %), based on total dry weight of the composition, has a total ash content of preferably at least 50 wt %, more preferably 65-85 wt %, based on total dry weight of the composition, and preferably has a total solid content of 7-35%, more preferably 10-30%, most preferably 18-28%.

The softened UF permeate originating from step (d), having the above characteristics, is ideally suited to be added to the UF retentate originating from step (a) and/or the UF retentate originating from step (b), or preferably to be added to the mixture of UF retentates originating from step (c), for the preparation of dairy products, preferably (dry) milk formulae, in particular for the preparation of a nutritional product for providing nutrition to infants. Thus, in a preferred embodiment of the process according to the invention, the softened UF permeate originating from step (d) is combined in step (e) with the UF retentate originating from step (a) and/or the UF retentate originating from step (b), or to the mixture of UF retentates originating from step (c). Most preferably the softened UF permeate originating from step (d) is combined in step (e) during or after the mixing of step (c), thus either with the mixture of UF retentates in step (c), or with the mixture of UF retentates originating from step (c).

In a preferred embodiment, at least 80 wt %, more preferably at least 90 wt % or even at least 95 wt %, most preferably at least 98 wt % of the lactose that is obtained in the UF permeates originating from step (a) and (b) is combined in step (e) with the UF retentates originating from step (a) and (b). The lactose content in a liquid composition can readily be determined by skilled person, e.g. enzymatically or by HPLC.

The process according to the invention affords residual water at several points, e.g. from the drying step, the optionally as nanofiltration permeates and/or the reverse osmosis permeates. In a preferred embodiment, this residual water, optionally after further purification by e.g. reverse osmosis, is recycled in the process according to the invention, e.g. used to dilute or reconstitute the first liquid composition (preferably the animal skim milk) and/or the second liquid composition comprising sweet whey and/or acid whey starting material, or as diafiltration water.

Definitions

The term "sweet whey" herein refers to the liquid (whey protein containing) by-product of the cheese manufacture industry which makes use of enzymatic cheese curd formation (e.g. based on casein precipitation using rennet), which material is readily accessible in the commercial market. Typically, whey proteins present in sweet whey include, i.a. beta-lactoglobulin, alpha-lactalbumin, bovine serum albumin, immunoglobulins, lactoferrin, lactoperoxidase and glycomacroprotein Conversely, the term "acid whey" herein refers to the liquid (whey protein containing) by-product of the cheese manufacture industry which makes use of (edible) acids for cheese curd formation (e.g. based on casein precipitation using acids such as citric acid), which material is readily accessible in the commercial market. Typically, whey proteins present in acid whey include, i.a. beta-lactoglobulin, alpha-lactalbumin, bovine serum albumin, immunoglobulins, lactoferrin and lactoperoxidase The term "casein" herein refers to casein or caseinate proteins as found in animal skim milk, such as bovine skim milk, more in particular cows' skim milk. Preferably, casein or caseinate is in substantially intact, non-hydrolyzed form.

As used herein, the term "polyvalent ions" refers to ions having a positive or negative charge of two or more. More in particular, this term refers to $Mg^{2+}$, $Ca^{2+}$ and polyvalent phosphate anions (e.g. $HPO_4^{2-}$, $PO_4^{3-}$). The term "monovalent ions" refers to ions having a positive or negative charge of one, in particular $Na^+$, $K^-$, $Cl^-$.

The term "removal of polyvalent ions" means that said polyvalent ions are removed from the UF permeate composition which is subjected to the polyvalent ion removal step (step (d)). Preferably, the term "removal of polyvalent ions" indicates that at least 10 or 20 wt % of the polyvalent ions that are present in said UF permeate (on dry weight basis thereof) is removed, preferably at least 50 wt %, 60 wt %, more preferably 70 wt % or at least 80 wt %, most preferably at least 90 wt %. The weight percentage (wt %) of polyvalent ion removal is determined by comparing the total weight of polyvalent ions present after step (c) to the total weight of polyvalent ions present prior to step (c). Likewise, the term "softening" is used to denote the removal of polyvalent ions. Hence, herein "softening" and "removal of polyvalent ions" is used interchangeably. Analogously, the term "softened" is used to refer to a composition from which polyvalent ions have been removed. "Significant polyvalent ion removal" denotes the removal of at least 70 wt % of the polyvalent ions, preferably at least 85 wt %, more preferably at least 95 wt % or even at least 99 wt % of the polyvalent ions. Polyvalent ion removal or softening may be accompanied with monovalent ion removal, either in the same step or in a separate step. Preferably, polyvalent ion removal refers to removal of at least or all of calcium, magnesium and/or phosphate species to the extent as defined in this paragraph.

The term "removal of monovalent ions" means that said monovalent ions are removed from the composition which is subjected to the monovalent ion removal step (preferably a softened UF permeate and/or any UF retentate). In case not indicated otherwise, preferably at least 10 or 20 wt % (on dry weight basis) of the monovalent ions is removed from the composition which was subjected to a monovalent ion removal step, more preferably at least 35 wt % or 50 wt %, most preferably at least 60 wt %. Removal of monovalent ions is particularly preferred in case the process according to the invention aims to manufacture dry powder formulations intended for use as infant nutrition. "Significant monovalent ion removal" denotes the removal of at least 70 wt % of the monovalent ions, preferably at least 85 wt %, more preferably at least 95 wt % or even at least 99 wt % of the monovalent ions. Preferably, monovalent ion removal refers to removal of at least or all of sodium, potassium and/or chloride to the extent as defined in this paragraph.

As used herein, the term "enriched" herein refers to the situation wherein the amount of a certain constituent of a (liquid) composition (as wt % based on dry weight) is higher after a process step, when compared to the content of the same ingredient in the (liquid) composition before said process step. Preferably, the dry weight percentage of an ingredient that is enriched has a content in a stream discharged from the process step of at least 110%, more preferably at least 125%, most preferably at least 150%, based on the dry weight percentage of said ingredient in the incoming stream of said process step. Exemplary is the ultrafiltration of skim milk, wherein the milk proteins are retained in the retentate while water and small solutes permeate through the ultrafiltration membrane. As such, any UF retentate is enriched in casein and whey proteins, as the content thereof in the retentate, as wt % based on dry weight of the composition, is increased compared to the wt % thereof in skim milk, as less small solutes are present. Likewise, the permeate is enriched in small solutes (e.g. enriched in lactose), as the amount of proteins is significantly reduced in the permeate, and lactose constitutes by far the largest part of the dry weight of the permeate.

The "total solid content" of a liquid composition denotes the weight percentage of solids present in the composition, based on the total weight of the composition. Solids include all non-volatiles, typically everything except water.

The "volume concentration factor" or "VCF" is the factor at which a liquid composition is concentrated upon filtration, i.e. the total volume of the incoming stream prior to filtration divided by the total volume of the retentate after filtration, irrespective of the total solid content. Thus, when 5 L of a liquid composition is fractionated over an ultrafiltration membrane into a permeate of 4 L and a retentate of 1 L, this UF process operates with a VCF of 5/1=5.

By a "UF retentate originating from" is meant the liquid retentate composition that is (directly) obtained from ultrafiltration steps (a) and (b). The term also refers to the UF retentates that are mixed in step (c) to obtain the mixture of UF retentates. Irrespective of whether between the obtaining of the UF retentate from step (a) and (b) and the mixing in step (c) or step (e) or drying in step (h), the UF retentate is subjected to a concentration step, such as reverse osmosis or nanofiltration, the term UF retentate still applies to this UF fraction. Thus, the term UF retentate is meant to denote the (protein enriched) fraction that is processed according to the steps of the invention from the ultrafiltration step up to the point where it is (re)combined with a UF permeate.

Similarly, the term "UF permeate originating from" herein means the liquid permeate composition that is (directly) obtained from ultrafiltration steps (a) and (b). The term also refers to the UF permeates that are conveyed as (liquid) compositions from the ultrafiltration step to the polyvalent ion removal module for execution of step (d), or to the monovalent ion removal module for execution of step (f) and/or any optional concentration step or module to eventually obtain the combined permeate/retentate product of step (e) or to obtain the dry powder in step (h). Irrespective of whether between the obtaining of the UF permeate from step (a) and (b) and the mixing in step (e) or drying in step (h), the UF permeate is subjected to a processing step (e.g. a polyvalent ion removal step, a concentration step, reverse osmosis and/or nanofiltration), within the context of the present invention the term UF permeate still applies to this UF fraction. Thus, the term UF permeate is meant to denote the (lactose enriched) fraction that is processed according to the steps of the invention from the ultrafiltration step up to the point where it is (re)combined with a UF retentate.

In the context of the present invention, a dry formula has a water content of at most 6 wt %, preferably 1-4 wt %, more preferably 2-3 wt %, based on total weight of the composition. The dry formula may be further processed into nutritional products, preferably products suitable for feeding human infants.

Preferred First and Second Liquid Compositions of the Invention

The first liquid composition comprises animal skim milk which comprises milk proteins and lactose. It comprises amounts of minerals that are typical for animal skim milk. The protein fraction thereof comprises 70-90 wt % casein and 10-30 wt % whey proteins, preferably 75-85 wt % casein and 15-25 wt % whey protein, based on dry total weight of the protein fraction. Preferably, it comprises 20-60 wt % protein, more preferably 25-50 wt % protein based on total dry weight of the first liquid composition. Preferably, the first liquid composition comprises 25-75 wt % lactose, more preferably 40-60 wt % lactose, based on total dry weight of the first liquid composition. Preferably, the first liquid composition comprises 3-15 wt % minerals, more preferably 5-10 wt % minerals, based on total dry weight of the first liquid composition. Preferably, the first liquid composition comprises 25-75 wt % monovalent ions, more preferably 30-60 wt % monovalent ions, and 25-75 wt % polyvalent ions, more preferably 40-70 wt % polyvalent ions, based on total dry weight of the minerals. Preferably, the first liquid composition has a total solid content between 3 and 15%, more preferably between 6 and 11%, most preferably between 7.5 and 10%. The fat content of the animal skim milk is typical for animal skim milk and lies well below that of non-skim milk. In particular, the fat content lies below 3 wt % (g/100 g animal skim milk), preferably below 2 wt %, more preferably below 1 wt %, most preferably below 0.5 wt %.

In an especially preferred embodiment, the first liquid composition comprises animal skim milk or is animal skim milk. Animal skim milk (i.e. non-human skim milk), preferably from bovine animals, and may be used as such, in diluted or concentrated form, as (optionally diluted) skim milk concentrate or as reconstituted skim milk powder. Most preferably, the first liquid composition is cows' skim milk. The animal skim milk may be pretreated before it is subjected to the process according to the invention. Such pre-treatment comprises or consists of a heat-treatment step (e.g. pasteurization) and/or filtration step to reduce the bacterial load of the animal skim milk. Preferably, the animal skim milk is not pre-treated with the aim to change the mineral content or profile thereof. In particular, the animal skim milk is preferably not (significantly) softened or subjected to monovalent ion removal before it enters the present ultrafiltration process.

The second liquid composition of the invention is a sweet whey and/or acid whey comprising composition which comprises protein, lactose and amounts of minerals that are typical for this type of whey (in the form of monovalent and polyvalent ions). The protein fraction of the liquid whey composition comprises 0-25 wt % casein and 75-100 wt % whey proteins, preferably 0-10 wt % casein and 90-100 wt % whey protein, most preferably 0-5 wt % casein and 95-100 wt % whey protein, based on dry total weight of the protein fraction. Preferably, the second composition comprises 5-40 wt % protein, more preferably 7-17 wt % protein based on total dry weight of the second liquid composition. Preferably, it comprises 40-90 wt % lactose, more preferably 60-80 wt % lactose, based on total dry weight of the second liquid composition. Preferably, the second composition comprises 3-15 wt % minerals, more preferably 6-12 wt % minerals, based on total dry weight of the second liquid composition. Preferably, the second composition comprises 40-90 wt % monovalent ions, more preferably 60-85 wt % monovalent ions, and 10-60 wt % polyvalent ions, more preferably 15-40 wt % polyvalent ions, based on total dry weight of the minerals. Preferably, it has a total solid content between 1 and 15%, more preferably between 3 and 10%, most preferably between 4 and 8%.

In an especially preferred embodiment, the second liquid composition is sweet whey and/or acid whey. The sweet and/or acid whey may be used as such, in diluted or concentrated form, as (optionally diluted) whey concentrate and as reconstituted whey from a powder. Both sweet whey and acid whey are suitable as liquid animal whey composition for use in the invention. Most preferably, the second liquid composition is sweet whey. The animal whey as used may be pretreated before it is subjected to an ultrafiltration step of the process according to the invention. Pre-treatment of the animal whey comprises or consists of heat-treatment (preferably pasteurization) and/or filtration to reduce the bacterial load of the animal whey. Preferably, the animal whey is not pre-treated with the aim to change the mineral content or profile thereof. In particular, the animal whey is not (significantly) softened or subjected to monovalent ion removal before it enters the present process.

Preferably, the second liquid composition comprises sweet whey, or the whey present therein consists of sweet whey or said whey comprises at least 20 wt % sweet whey of the total whey (on total weight basis of the whey present in the second liquid composition), or at least 40 wt % sweet whey, or at least 60 wt % sweet whey, or at least 80 wt % sweet whey, or even at least 90 wt % sweet whey. In such cases, the remainder of the whey comprises acid whey.

Intermediary Products Obtainable During Execution of the Process

The present invention also relates to intermediary products obtained during execution of the process according to the invention.

In a first aspect, the intermediary products of the invention relate to a liquid composition obtainable by the nanofiltration of the UF retentate originating from UF of the first liquid composition in step (j1), i.e. the nanofiltration retentate obtained by NF of the UF retentate originating from UF of the animal skim milk composition. The liquid composition according to this first aspect comprises:
(a) 30-75 wt % proteins, preferably 40-65 wt % proteins, more preferable 45-60 wt % proteins, based on total dry weight of the composition,
(b) 20-50 wt % lactose, preferably 30-38 wt % lactose, based on total dry weight of the composition, and
(c) minerals in the form of monovalent and polyvalent ions.

The protein fraction (a) preferably is not changed with respect to the protein fraction as present in animal skim milk. Thus, the protein fraction (a) preferably comprises 70-90 wt % casein and 10-30 wt % whey protein, preferably 75-85 wt % casein and 15-25 wt % whey protein, based on total protein. The monovalent ions of fraction (c) preferably comprise sodium, more preferably 0.1-0.5 wt % sodium, most preferably 0.15-0.4 wt % sodium, based on total dry weight of the composition. The monovalent ions of fraction (c) preferably comprise potassium, more preferably 0.3-2 wt % potassium, most preferably 0.7-1.2 wt % potassium, based on total dry weight of the composition. The monovalent ions of fraction (c) preferably comprise chloride, more preferably 0.05-1 wt % chloride, most preferably 0.1-0.4 wt % chloride, based on total dry weight of the composition. The polyvalent ions of fraction (c) preferably comprise magnesium, more preferably 0.01-0.5 wt % magnesium, most preferably 0.05-0.2 wt % magnesium, based on total dry weight of the composition. The polyvalent ions of fraction (c) preferably comprise calcium, more preferably 0.5-3 wt % calcium, most preferably 1.2-2 wt % calcium, based on total dry weight of the composition. The polyvalent ions of fraction (c) preferably comprise phosphate, more preferably 0.4-2.5 wt % phosphate, most preferably 0.8-1.8 wt % phosphate, based on total dry weight of the composition. The total mineral content of fraction (c) preferably adds up to a total ash content of 2-13 wt %, more preferably 5-9 wt %, based on total dry weight of the composition. The composition preferably has a total solid content of 5-30%, more preferably 10-25%, most preferably 16-20%.

In a second aspect, the intermediary products of the invention relate to a liquid composition obtainable by the nanofiltration of the UF retentate originating from UF of the sweet whey and/or acid whey comprising composition in step (j1), i.e. the nanofiltration retentate obtained by NF of the UF retentate originating from UF of the second liquid composition. The liquid composition according to this second aspect comprises:
(a) 15-55 wt % proteins, preferably 25-45 wt % proteins, more preferable 30-40 wt % proteins, based on total dry weight of the composition,
(b) 35-65 wt % lactose, preferably 45-55 wt % lactose, based on total dry weight of the composition, and
(c) minerals in the form of monovalent and polyvalent ions.

The protein fraction (a) preferably is not changed with respect to the protein fraction as present in sweet whey and/or acid whey. Thus, the protein fraction (a) preferably comprises 0-25 wt % casein and 75-100 wt % whey protein, preferably 0-10 wt % casein and 90-100 wt % whey protein, most preferably 0-5 wt % casein and 95-100 wt % whey protein. The monovalent ions of fraction (c) preferably comprise sodium, more preferably 0.1-1 wt % sodium, most preferably 0.15-0.5 wt % sodium, based on total dry weight of the composition. The monovalent ions of fraction (c) preferably comprise potassium, more preferably 0.3-2 wt % potassium, most preferably 0.6-1 wt % potassium, based on total dry weight of the composition. The monovalent ions of fraction (c) preferably comprise chloride, more preferably 0.05-1 wt % chloride, most preferably 0.1-0.4 wt % chloride, based on total dry weight of the composition. The polyvalent ions of fraction (c) preferably comprise magnesium, more preferably 0.01-0.5 wt % magnesium, most preferably 0.05-0.2 wt % magnesium, based on total dry weight of the composition. The polyvalent ions of fraction (c) preferably comprise calcium, more preferably 0.2-1.5 wt % calcium, most preferably 0.4-1 wt % calcium, based on total dry weight of the composition. The polyvalent ions of fraction (c) preferably comprise phosphate, more preferably 0.1-1.5 wt % phosphate, most preferably 0.4-0.8 wt % phosphate, based on total dry weight of the composition. The total mineral content of fraction (c) preferably adds up to a total ash content of 1-13 wt %, more preferably 5-9 wt %, based on total dry weight of the composition. The composition preferably has a total solid content of 5-30%, more preferably 10-25%, most preferably 16-20%.

In a third aspect, the intermediary products of the invention relate to a liquid composition obtainable by the nanofiltration of step (j2), i.e. the nanofiltration retentate obtained by NF of the softened UF permeate originating from the combined UF permeates of the first and second liquid compositions. The liquid composition according to this third aspect comprises:
(a) at most 5 wt % proteins, preferably at most 1 wt % proteins, based on total dry weight of the composition,
(b) 75-100 wt % lactose, preferably 90-100 wt % lactose, most preferably 95-99 wt % lactose, based on total dry weight of the composition, and
(c) at most 5 wt % minerals in the form of monovalent and polyvalent ions, preferably at most 1 wt % minerals, based on total dry weight of the composition.

Preferably, the composition is substantially depleted from polyvalent ions, i.e. the composition preferably comprises at most 1 wt % polyvalent ions, more preferably at most 0.5 wt % polyvalent ions, most preferably at most 0.35 wt % polyvalent ions. The monovalent ions of fraction (c) preferably comprise at most 1.5 wt % sodium, more preferably 0.2-0.7 wt % sodium, based on total dry weight of the composition. The monovalent ions of fraction (c) preferably comprise at most 1 wt % potassium, more preferably 0.1-0.5 wt % potassium, based on total dry weight of the composition. The monovalent ions of fraction (c) preferably comprise at most 1.5 wt % chloride, more preferably 0.3-1 wt % chloride, based on total dry weight of the composition. The polyvalent ions of fraction (c) preferably comprise at most 0.1 wt % magnesium, more preferably at most 0.02 wt % magnesium, based on total dry weight of the composition. The polyvalent ions of fraction (c) preferably comprise at most 0.2 wt % calcium, more preferably at most 0.1 wt % calcium, based on total dry weight of the composition. The polyvalent ions of fraction (c) preferably comprise at most 0.5 wt % phosphate, more preferably at most 0.3 wt % phosphate, based on total dry weight of the composition. The total mineral content of fraction (c) preferably adds up to a total ash content of at most 5 wt %, more preferably 1-4 wt %, based on total dry weight of the composition. The composition preferably has a total solid content of 7-35%, more preferably 10-30%, most preferably 18-28%.

In a fourth aspect, the intermediary products of the invention relate to a liquid composition obtainable by the mixing of step (c), i.e. the mixture of UF retentates obtained by UF of the first and second liquid compositions. The liquid composition according to this fourth aspect comprises: a protein content of between 40 and 52 wt %, wherein casein and whey are present in a weight ratio which lies between 70:30 and 30:70, lactose in an amount of between 35 and 50 wt %; and the following minerals: magnesium in an amount of between 0.01 and 0.30 wt %, calcium in an amount of between 0.80 and 1.70 wt %, phosphorus in an amount of between 0.60 and 1.50 wt %, sodium in an amount of between 0.10 and 0.60 wt %, chloride in an amount of between 0.05 and 0.60 wt % and potassium in an amount of between 0.60 and 1.50 wt %, all based on dry weight of the intermediary product.

In a fifth aspect, the intermediary products of the invention relate to a liquid composition obtainable by the combining of step (e), i.e. the mixture of UF retentates obtained by UF of the first and second liquid compositions and the softened UF permeate originating from the combined UF permeates of the first and second liquid compositions. The liquid composition according to this fifth aspect comprises: a protein content of between 16 and 24 wt %, wherein casein and whey are present in a weight ratio which lies between 70:30 and 30:70, lactose in an amount of between 65 and 80 wt %; and the following minerals: magnesium in an amount of between 0.01 and 0.25 wt %, calcium in an amount of between 0.20 and 0.80 wt %, phosphorus in an amount of between 0.40 and 0.80 wt %, sodium in an amount of between 0.20 and 0.80 wt %, chloride in an amount of between 0.30 and 0.90 wt % and potassium in an amount of between 0.30 and 0.90 wt %.

Use of Intermediary Products Obtainable by the Process of the Invention

The present invention also relates to uses of the intermediary products according to the invention, obtainable during execution of the process as described above, especially the use of those products in the preparation of nutritional products suitable for feeding human infants, or bases for such nutritional products. Likewise, the present invention also relates to processes for the preparation of nutritional products suitable for feeding human infants, or bases for such nutritional products using one or more of the intermediary products according to the invention, obtainable during execution of the process as described above.

In the context of the present invention, a base for nutritional products suitable for feeding human infants denotes a dairy product, preferably a powder, in which all ingredients are on or below their required level for infant nutrition. Some of the required or beneficial ingredients, such as lipids, prebiotics, vitamins and minerals, may be below the required level, and need to be supplemented to the base, in order to prepare nutritional products suitable for feeding human infants. The skilled person is aware of bases for nutritional products suitable for feeding human infants, and knows which ingredients may need supplementation and how such supplementation is accomplished.

In particular, the present invention relates to a process for making infant nutrition or a base for infant nutrition, obtainable from the intermediary products, comprising:
(I) mixing the liquid composition according to the first aspect with a source of lactose, preferably the liquid composition according to the third aspect, and a source of whey proteins, preferably the liquid composition according to the second aspect; or
(II) mixing the liquid composition according to the fourth aspect with a source of lactose, preferably the liquid composition according to the third aspect; or
(III) providing the liquid composition according to the fifth aspect; and
(IV) optionally adding further ingredients to the (mixed) product of step (I), (II) or (III), or to the dried product of step (V),
(V) drying the product of step (I), (II), (III) or (IV).

The further ingredients that may be added in step (IV) are known in the art, and preferably include, more preferably are selected from, lipids, vitamins, minerals, prebiotics, probiotics and/or additional lactose.

Figures

Here and below in the Figures, several embodiments of the system according to the invention are depicted. With reference to the included Figures, the system according to the invention is described as follows.

System for Executing the Process According to the Invention

The present invention also relates to an apparatus or system specifically designed to implement the process according to the invention. The system according to the invention is preferably a modular system, in which three or more modules are in fluid connection with each other. Herein, each module may be a separate unit or two or more modules may be integrated as a single unit. Preferably, each module is a separate unit and is distinguishable as such in the system.

The system according to the invention is arranged to receive two incoming liquid compositions (e.g. animal skim milk, and a liquid composition comprising sweet whey and/or acid whey), and to discharge a solid composition. In addition thereto, further liquid and/or solid compositions may be received by the system or discharged from the system.

The system according to the invention comprises a first ultrafiltration module (1) comprising an ultrafiltration membrane (1b). The first module is designed to receive the first liquid composition, in particular animal skim milk as via a first inlet (1a) to a first side of the UF membrane (1b). For executing the process according to the invention, the first liquid composition is preferably the animal skim milk as meant herein. In addition, the first module (1) comprises a first outlet (1c) for discharging an ultrafiltration retentate (UFR1) from the first side of the UF membrane (1b) and a second outlet (1d) for discharging an ultrafiltration permeate (UFP1) from the second side of the UF membrane (1b). The UF membrane (1b) has two sides, one for receiving the incoming first liquid composition and discharging the UFR1, and one for discharging the UFP1. The UFP1 thus comprises only material that has permeated through the UF membrane (1b). The UF membrane (1b) employed in the first module can be any UF membrane known in the art, including ceramic membranes and organic spiral wound membranes. The UF membrane (1b) has a molecular weight cut-off of that enables proteins, such as whey proteins and casein, to remain in the retentate. Preferably, the molecular weight cut-off is at most 25 kDa, more preferably at most 10 kDa, and preferably of at least 2.5 kDa, more preferably at least 5 kDa.

The system according to the invention comprises a second ultrafiltration module (2), comprising a ultrafiltration membrane (2b). The second ultrafiltration module (2) is designed to receive the second liquid composition comprising sweet whey and/or acid whey via a first inlet (2a) to a first side of the second UF membrane (2b). In addition, the second ultrafiltration module (2) comprises a first outlet (2c) for discharging an ultrafiltration retentate (UFR2) from the first side of the second UF membrane (2b) and a second outlet (2d) for discharging an ultrafiltration permeate (UFP2) from the second side of the second UF membrane (2b). The UF membrane (2b) employed in the ultrafiltration module (2) can be any UF membrane known in the art, including ceramic membranes and organic spiral wound membranes, preferably UF membrane (2b) is an organic spiral wound membrane. UF membrane (2b) has a molecular weight cut-off that enables proteins, such as whey proteins and casein, to remain in the retentate. Preferably, the molecular weight cut-off is at most 25 kDa, more preferably at most 10 kDa, and preferably of at least 2.5 kDa, more preferably at least 5 kDa.

The system according to the invention comprises a mixing module (3) for mixing at least two liquid streams, at least two solid streams (e.g. powders) or at least one liquid stream and at least one solid stream, preferably for mixing at least two liquid streams. The mixing module (3) preferably enables mixing of the UF retentate originating from ultrafiltration module (1), the UF retentate originating from ultrafiltration module (2) and optionally the softened UFP originating from the polyvalent ion removal unit (5).

The mixing module (3) is designed to receive the UF retentate originating from ultrafiltration module (1) via a first inlet (3a) and to receive the UF retentate originating from ultrafiltration module (2) via a second inlet (3b). The second module comprises an outlet (3c) for discharging the mixture of UF retentates. In a preferred embodiment, the mixing module (3) comprises a third inlet (3d) designed to receive the softened UFP originating from the polyvalent ion removal unit (5), and the outlet (3c) is for discharging the mixture of UF retentates and the softened UFP, referred to as the combined product. Alternatively, mixing of the mixture of UF retentates originating from mixing module (3) with the softened UFP originating from the polyvalent ion removal unit (5) may be accomplished in a separate mixing module, which is designed to discharge the combined product.

Mixing may be accomplished by merely combining the two or three incoming composition, but preferably the mixing module (3) further comprises mixing means (3d). The mixing means (3d) may be any means suitable for mixing two or three compositions known in the art, such as "in pipe" (i.e. by the joining of two or three incoming pipes into one single outgoing pipe), in a (balance) tank or vessel, in an agitated vessel, or by any industrial mixer or blender known in the art. Suitable mixing means include means for mixing two or three liquid compositions, e.g. dynamic mixing or static mixing, or for mixing two or three solid compositions (e.g. two powders), e.g. a dry blender such as a ribbon blender, a paddle blender, a tumble blender and a vertical blender, or at least one liquid composition and at least one solid composition, preferably for mixing two or three liquid compositions. In an especially preferred embodiment, the mixing means is "in pipe" or in a balance tank.

The mixing module (3) is arranged in the system after the first ultrafiltration module (1) and the second ultrafiltration module (2). Outlet (1c) of the first ultrafiltration module (1) is in fluid connectivity with inlet (3a) of the mixing module (3) and outlet (2c) of the second ultrafiltration module (2) is in fluid connectivity with inlet (3b) of the mixing module (3)

The system according to the invention may comprise further modules or further features as described here below.

The system according to the invention preferably comprises a drying module (4) for drying at least one liquid composition, preferably for drying the combined product. Drying module (4) is designed to receive a liquid composition (e.g. the combined product) via an inlet (4a) to a drying means (4b), and to discharge a solid composition via an outlet (4c) from the drying means (4b). The drying means (4b) may be any means suitable for drying a liquid composition known in the art, e.g. a spray dryer, a (fluidized) bed dryer, a drum dryer, a freeze dryer, a roller dryer, etc. In an especially preferred embodiment, the drying means (4b) is a spray dryer.

The drying module (4) may be arranged in the system before the mixing module (3) or after the mixing module (3), as long as it is arranged after the first ultrafiltration module (1) and the second ultrafiltration module (2). In case the drying module (4) is arranged in between the first ultrafiltration module (1) and/or the second ultrafiltration module (2) and the mixing module (3) at least one of the ultrafiltration retentates originating from ultrafiltration module (1) and/or (2) is dried prior to mixing. In case the third module is arranged after the mixing module (3), the ultrafiltration retentates are first mixed and then the mixture of the UF retentates originating from mixing module (3) is dried.

Optionally, the system according to the invention comprises further drying module(s), each for drying at least one liquid stream. Each drying module is designed to receive a liquid composition via an inlet to a drying means, and to discharge a solid composition via an outlet from the drying means. The drying means may be any means suitable for drying a liquid composition known in the art, e.g. a spray dryer, a (fluidized) bed dryer, a drum dryer, a freeze dryer, a roller dryer, etc. In an especially preferred embodiment, the drying means is a spray dryer. A further drying module may be arranged in the system before the mixing module (3) and after the second ultrafiltration module (2), preferably in case the first drying module (4) is arranged before the mixing module (3) and after the first ultrafiltration module (1). As such, the ultrafiltration retentates discharged from both ultrafiltration modules (1) and (10) are dried prior to mixing in the mixing module (3).

In a preferred embodiment, the system according to the invention comprises a polyvalent ion removal module (5) for removing polyvalent ions from one or more ultrafiltration permeates (UFPs). The polyvalent ion removal module (5) comprises an inlet (5a) for receiving the one or more UFPs, a polyvalent ion removal unit (5b), and an outlet (5c) for discharging a softened UFP. The polyvalent ion removal unit (5b) may comprise a means for removing (significant amounts of) polyvalent ions (i.e. ions having a positive or negative charge of two or more) and optionally for removing (significant amounts of) monovalent ions. The means for removing (significant amounts of) monovalent ions may be joined with the polyvalent ion removal unit (5b), or may be present in a separate monovalent ion removal module (6). In case means for removing (significant amounts of) polyvalent ions and means for removing (significant amounts of) monovalent ions are present, those means may be a single unit, capable of removing both polyvalent and monovalent ions, or preferably two separate such units, one capable of removing polyvalent ions and one capable of removing monovalent ions. The two separate such units are preferably present in two distinct modules, a polyvalent ion removal module (5) and a monovalent ion removal module (6), wherein an outlet (5c) of the polyvalent ion removal module (5) is in fluid connectivity with an inlet (6a) of the monovalent ion removal module (6). The monovalent ion removal module (6) comprises an inlet (6a) for receiving the softened UFP, a monovalent ion removal unit (6b), and an outlet (6c) for discharging a softened UFP, from which monovalent ions are removed.

Any technique known in the art for removing polyvalent and for removing monovalent ions may be used as means for removing polyvalent ions (5b) and means for removing monovalent ions (6b). Conveniently, the monovalent ion removal unit(s) is/are selected from an electrodialysis set-up (comprising ion exchange membranes and means for applying an electric potential difference), an ion exchange set-up (comprising at least one column filled with anionic and/or cationic resins), a salt precipitation set-up, a nanofiltration membrane or a diafiltration membrane, or combinations thereof. In an preferred embodiment, polyvalent ion removal module (5) comprises at least one ion exchange column comprising anion and/or cation exchange resins as polyvalent ion removal unit (5b) and the monovalent ion removal module (6) comprises a nanofiltration membrane as monovalent ion removal unit (6b). In case the monovalent ion removal module (6) comprises a nanofiltration membrane as monovalent ion removal unit (6b), the monovalent ion removal module (6) is designed to receive the softened UFP via a first inlet (6a) to a first side of the NF membrane (6b). In addition, the monovalent ion removal module (6) comprises a first outlet (6c) for discharging a nanofiltration retentate from the first side of the NF membrane (6b) and a second outlet (6d) for discharging a nanofiltration permeate from the second side of the NF membrane (6b). The NF membrane (6b) employed in the monovalent ion removal module (6) can be any NF membrane known in the art. Typically, a spiral wound membrane having a molecular weight cut-off of at most 500 Da, preferably at most 300 Da, and of at least 100 Da, preferably at least 150 Da, is used. Preferably, the monovalent ion removal module (6) comprises means for enhancing nanofiltration with diafiltration, preferably this means is an additional inlet (6e) for receiving diafiltration water.

In an especially preferred embodiment, the polyvalent ion removal module (5) a monovalent ion removal module (6) together comprise three or preferably four modules, i.e. a nanofiltration module (6-i) as monovalent ion removal module (6), a salt precipitation module (5-i) and a precipitate removal module (5-ii) as polyvalent ion removal modules (5) and preferably a second nanofiltration module (6-ii) and/or an electrodialysis module (5-iii), more preferably an electrodialysis module (5-iii). It is preferred that these modules are arranged in such a way that:

the nanofiltration module (6-i) is capable of receiving the one or more UFPs, removing monovalent ions by filtration through a nanofiltration membrane, and discharging a nanofiltration permeate to the salt precipitation module (5-i);

the salt precipitation module (5-i) is capable of receiving the nanofiltration permeate from module (6-i), causing precipitation of salts, in particular salts comprising polyvalent ions, and discharging a liquid stream containing precipitates to the precipitate removal module (5-ii);

the precipitate removal module (5-ii) is capable of receiving the liquid stream containing precipitates from module (5-i), removing the precipitates, preferably by filtration through an ultrafiltration membrane, and discharging a softened UFP, preferably to the electrodialysis module (5-iii);

and preferably the electrodialysis module (5-iii) is capable of receiving the softened UFP from module (5-ii), removing monovalent and/or polyvalent ions from the softened UFP and discharging a softened UFP.

The salt precipitation module (5-i) comprises means for causing precipitation of salts, in particular salts comprising polyvalent ions. Any technique known in the art may be used as means for causing precipitation of salts. Preferably, the technique for causing precipitation of salts is selected from the addition of a strong base, such as sodium hydroxide, pH adjustment to a neutral pH, such as between 6 and 8, and increasing the temperature to between 70 and 90° C., followed by decreasing the temperature to a between 5 and 30° C. The skilled person knows how to arrange the salt precipitation module (5-i) in order to perform these techniques. The precipitate removal module (5-ii) is preferably an ultrafiltration module, capable of removing the precipitates from the liquid stream by ultrafiltration, in which the softened UFP may be discharged as ultrafiltration permeate. The electrodialysis module (5-iii) may comprise any electrodialysis set-up as known in the art. Within the context of this embodiment, the electrodialysis module (5-iii) may be replaced by a second nanofiltration module (6-ii), which is capable of receiving the softened UFP from module (5-ii), removing monovalent ions from the softened UFP and discharging a softened UFP. The outlet for discharging the softened UFP from module (5-ii), (5-iii) or (6-ii) is preferably in fluid connectivity with inlet (3d) of the mixing module (3).

In the system according to the invention, the polyvalent ion removal module (5) is preferably arranged in between the first ultrafiltration module (1) and/or the second ultrafiltration module (2) and the mixing module (3), more preferably the polyvalent ion removal module (5) is arranged in between the first ultrafiltration module (1) and/or the second ultrafiltration module (2) and the monovalent ion removal module (6), and the monovalent ion removal module (6) is arranged in between the polyvalent ion removal module (5) and the mixing module (3). Outlet (1d) of the first ultrafiltration module (1) and outlet (2d) of the second ultrafiltration module (2) are in fluid connectivity with inlet (5a) of the polyvalent ion removal unit (5), and outlet (5c) of the polyvalent ion removal unit (5) is in fluid connectivity with inlet (3d) of the mixing module (3), or more preferably outlet (5c) of the polyvalent ion removal unit (5) is in fluid connectivity with inlet (6a) of the monovalent ion removal module (6) and outlet (6c) of the monovalent ion removal module (6) is in fluid connectivity with inlet (3d) of the mixing module (3).

In a further preferred embodiment, the system according to the invention comprises one or more concentration modules for concentrating (a) liquid stream(s), preferably at least two concentration modules, one concentration module (7) for concentrating the UF retentate originating from the first ultrafiltration module (1) and one concentration module (8)

for concentrating the UF retentate originating from the second ultrafiltration module (2).

Concentration module (7) comprises an inlet (7a) for receiving the UF retentate originating from the first ultrafiltration module (1) to a means for concentrating (7b), a means for concentrating (7b) and an outlet (7c) for discharging a concentrated UF retentate. Any concentration technique known in the art may be used as means for concentrating (7b). Conveniently, the means for concentrating (7b) is selected from an evaporation set-up (e.g. by increasing the temperature and/or reducing the pressure) or a membrane filtration set-up (e.g. a reverse osmosis membrane or a nanofiltration membrane), most preferably the means for concentrating (7b) is a nanofiltration membrane. In case the concentration module (7) comprises a nanofiltration membrane as means for concentrating (7b), the concentration module (7) is designed to receive the UF retentate via a first inlet (7a) to a first side of the NF membrane (7b). In addition, the concentration module (7) comprises a first outlet (7c) for discharging a concentrated UF retentate as NF retentate from the first side of the NF membrane (7b) and a second outlet (7d) for discharging a nanofiltration permeate from the second side of the NF membrane (7b). The NF membrane (7b) employed in the concentration module (7) can be any NF membrane known in the art. Typically, a spiral wound membrane having a molecular weight cut-off of at most 500 Da, preferably at most 300 Da, and of at least 100 Da, preferably at least 150 Da, is used.

Concentration module (8) comprises an inlet (8a) for receiving the UF retentate originating from the second ultrafiltration module (2) to a means for concentrating (8b), a means for concentrating (8b) and an outlet (8c) for discharging a concentrated UF retentate. Any concentration technique known in the art may be used as means for concentrating (8b). Conveniently, the means for concentrating (8b) is selected from an evaporation set-up (e.g. by increasing the temperature and/or reducing the pressure) or a membrane filtration set-up (e.g. a reverse osmosis membrane or a nanofiltration membrane), most preferably the means for concentrating (8b) is a nanofiltration membrane. In case the concentration module (8) comprises a nanofiltration membrane as means for concentrating (8b), the concentration module (8) is designed to receive the UF retentate via a first inlet (8a) to a first side of the NF membrane (8b). In addition, the concentration module (8) comprises a first outlet (8c) for discharging a concentrated UF retentate as NF retentate from the first side of the NF membrane (8b) and a second outlet (8d) for discharging a nanofiltration permeate from the second side of the NF membrane (8b). The NF membrane (8b) employed in the concentration module (8) can be any NF membrane known in the art. Typically, a spiral wound membrane having a molecular weight cut-off of at most 500 Da, preferably at most 300 Da, and of at least 100 Da, preferably at least 150 Da, is used.

In a further preferred embodiment, the system according to the invention comprises means for recycling (residual) water from outgoing streams to incoming streams. Residual water may be obtained in the drying module (4), in the monovalent ion removal module (6) (e.g. as nanofiltration permeate) and in each of the concentration modules (7) and (8) (e.g. as nanofiltration permeate). Preferably, at least one of the drying module (4), the monovalent ion removal module (6) and the concentration modules (7) and (8) further comprises an (additional) outlet for discharging water from the module, more preferably, at least one of the concentration modules (7) and (8) comprises such an outlet. Most preferably, the drying module (4), the monovalent ion removal module (6) and the concentration modules (7) and (8) each comprise such an outlet. The residual water may be used to dilute any of the incoming liquid compositions, e.g. the first liquid composition and/or the second liquid composition, or may be used as diafiltration water, e.g. in the monovalent ion removal module (6). Preferably, the first ultrafiltration module (1) and/or the second ultrafiltration module (2) and/or the monovalent ion removal module (6) further comprise an additional inlet for receiving residual water. The skilled person appreciates that the outlets for discharging residual water are in fluid connectivity with the inlets for receiving residual water by a conduit, wherein optionally one or more collection tanks or further purification means (e.g. reverse osmosis membranes) are integrated.

In a further preferred embodiment, the system according to the invention comprises means for heat treating (9) and (10) a liquid composition. Any of the liquid compositions which are led through the system according to the invention may suitably be heat treated, using any heat treatment technique known in the art. Conveniently, the system according to the invention comprises at least one of an eighth module for heat treating a liquid composition. Such a heat treatment module comprises an inlet for receiving a liquid composition to a means for heat treatment (9), a means for heat treatment and an outlet for discharging a heat treated liquid composition. Any heat treatment technique known in the art may be used as means for heat treatment, such as pasteurization or sterilization set-up. Preferably, a plate heat exchanger (9, PHE) and/or a direct steam injection/infusion (10, DSI) is used as heat treatment means. Means for heat treating (13) the combined product originating from mixing module (3) are installed before the drying module (4), which enables the heat treatment of the combined product originating from mixing module (3). Preferably the means for heat treatment (13) is a direct steam injector operating at a temperature of about 120° C.

The system according to the invention may further comprise chilling means, preferably to enable the system to operate at a temperature below 40° C., more preferably between 3° C. and 30° C., most preferably between 5° C. and 20° C. Each module may have a separate chilling means, or a central chilling means may be installed to regulate the temperature in the entire system. Preferably, the chilling means are selected from cooling tower, heat exchanger (plate or tubular, preferably in connection with the PHE used for heat treatment), cooling by coolant (heat transfer fluid), pumpable ice technique.

Means for chilling (11) the nanofiltration retentate originating from the first concentration module (7) are installed before the mixing module (3), which enables chilling of the nanofiltration retentate originating from the first concentration module (7). Preferably the means for chilling (11) is a plate heat exchanger operating at a temperature of about 4° C. Means for chilling (12) the nanofiltration retentate originating from the second concentration module (8) are installed before the mixing module (3), which enables chilling of the nanofiltration retentate originating from the second concentration module (8). Preferably the means for chilling (12) is a plate heat exchanger operating at a temperature of about 4° C. It is highly preferred that the plate heat exchangers that are used as heat treatment means (e.g. operating at a temperature of about 80° C.) are in thermal connectivity with the plate heat exchangers that are used as chilling means (e.g. operating at a temperature of about 4° C.).

Nanofiltration and diafiltration both require the presence of a nanofiltration membrane. To accomplish diafiltration, the module requires an additional inlet for receiving water to the first side of the nanofiltration membrane, as such enabling dilution and re-filtration of the nanofiltration retentate.

All filtration modules preferably comprise means to facilitate the permeations of the solvent and optionally small solutes through the membrane. Any means known in the art may be used to accomplish easy permeation, such as using gravity or the application of transmembrane pressure (TMP). TMP may be accomplished by pressurizing the first side of the membrane (i.e. the retentate side) or by depressurizing the second side of the membrane (i.e. the permeate side). Suitably, a pump using hydrostatic pressure to pressure the first side of the membrane and/or a pump generating suction at the second side of the membrane is used. Suitable pumps include centrifugal pumps and positive displacement pumps, preferably centrifugal pumps are used.

In the system according to the invention, the different modules are interconnected, i.e. the outlet of one module is in fluid connectivity with the inlet of another module, preferably using a conduit.

The system according to the invention preferably operates with 500-2500 kg, more preferably 800-1800 kg, most preferably 1000-1400 kg dry matter of the first liquid composition, preferably of animal skim milk, incoming per hour. The system according to the invention preferably operates with 1500-5000 kg, more preferably 2200-4000 kg, most preferably 2600-3000 kg dry matter of the second liquid composition, preferably of animal whey, incoming per hour. The system according to the invention preferably operates with 750-4000 kg, more preferably 1000-3000 kg, most preferably 1500-2000 kg UF retentate discharged from the ultrafiltration module(s) per hour from both incoming streams combined. The process according to the invention preferably operates with 1000-5000 kg, more preferably 1500-4000 kg, most preferably 2000-2500 kg UF permeate discharged from the ultrafiltration module(s) per hour from both incoming streams combined.

The invention will now be illustrated by several examples which are not meant to limit the invention in any manner.

EXAMPLES

Example 1

400 kg of pasteurized cows' skim milk with a casein to whey protein weight ratio of 80:20 was subjected to ultrafiltration over a Synder ST3838 UF membrane having a MWCO of 10 kDa. Ultrafiltration was performed at a temperature between 8 and 10° C., with a transmembrane pressure of 2 bar and a VCF of about 2. The permeate was collected in a flow rate of up to 260 L/h. 208 kg of a UF permeate (UFP1) and 211 kg of a UF retentate (UFR1) was obtained. The compositions of the incoming skim milk and the products of the ultrafiltration are given in table 1. The slight increase in total weight of the final products (UFR1 and UFP1) compared to the incoming skim milk can be attributed to dilution of the plant dead volume during the changeover from product to water during plant flushing. As can be seen from the data of table 1, the UF retentate is enriched in proteins, whereas the UF permeate is enriched in lactose.

TABLE 1

Compositions of example 1 (in wt % based on total dry weight)

| Component | Cows' skim milk | UFR1 | UFP1 |
|---|---|---|---|
| protein | 36.2 | 51.7 | 0.0 |
| Lactose | 51.8 | 36.5 | 87.6 |
| ash | 8.7 | 8.4 | 9.1 |
| —Na | 0.46 | 0.35 | 0.70 |
| —K | 1.83 | 1.40 | 2.69 |
| —Cl | 1.13 | 0.66 | 1.61 |
| —P | 1.16 | 1.32 | 0.76 |
| —Ca | 1.37 | 1.67 | 0.80 |
| —Mg | 0.12 | 0.12 | 0.13 |

Example 2

1000 kg of pasteurized sweet whey with whey proteins as the sole protein source was subjected to ultrafiltration over a Synder ST3838 UF membrane having a MWCO of 10 kDa. Ultrafiltration was performed at a temperature between 10 and 12° C., and with a transmembrane pressure of 2 bar and a VCF of about 5. The permeate was collected in a flow rate of up to 400 L/h. 818 kg of a UF permeate (UFP2) and 195 kg of a UF retentate (UFR2) was obtained. The compositions of the incoming sweet whey and the products of the ultrafiltration are given in table 2. The slight increase in total weight of the final products (UFR1 and UFP1) compared to the incoming sweet whey can be attributed to dilution of the plant dead volume during the changeover from product to water during plant flushing.

TABLE 2

Compositions of example 2 (in wt % based on total dry weight)

| Component | Sweet whey | UFR2 | UFP2 |
|---|---|---|---|
| Protein | 9.7 | 35.1 | 0.0 |
| lactose | 76.9 | 50.0 | 87.4 |
| ash | 8.6 | 6.7 | 9.3 |
| —Na | 0.67 | 0.49 | 0.74 |
| —K | 2.58 | 1.92 | 2.84 |
| —Cl | 1.44 | 0.95 | 1.69 |
| —P | 0.82 | 0.58 | 0.73 |
| —Ca | 0.81 | 0.69 | 0.86 |
| —Mg | 0.14 | 0.10 | 0.15 |

Example 3

The UFP1 of example 1 and the UFP2 of example 2 were combined in a weight ratio of 20/80 to obtain 799 kg of a combined UFP. The combined UFP was subjected to ion exchange to produce a softened UFP, and subsequently to nanofiltration enhanced with diafiltration. Ion exchange employed an anionic resin charged with chloride ions and a cationic resin charged with sodium ions, to exchange the polyvalent ions for sodium and chloride. Ion exchange operated at a pH between 2.4 and 4.3 and a temperature between 5 and 10° C. Nanofiltration employed a Synder NFX 3838 NF membrane having MWCO of 150-300 Da, operated at a temperature between 8 and 22° C., and with a transmembrane pressure of 2 bar. The permeate was collected in a flow rate of up to 400 L/h. Two diafiltration volumes of, 200 L of water were added sequentially when the retentate total solids content reached 20%. The softened UFP was concentrated to a final total solid content of about 20%. 178 kg of a softened UFP concentrate was obtained as a nanofiltration retentate (NFR1), together with 1225 kg of a nanofiltration permeate (NFP1). The compositions of the incoming combined UFP and the products of the nanofiltration are given in table 3. The great majority of the polyvalent ions were removed during ion exchange and the great majority of the monovalent ions ended up in the NFP1. The softened UFP concentrate (NFR1) contained almost exclusively lactose.

TABLE 3

Compositions of example 3 (in wt % based on total dry weight)

| component | Combined UFP | NFR1 | softened UFP concentrate (NFP1) |
|---|---|---|---|
| protein | 0.0 | 0.0 | 0.0 |
| lactose | 86.8 | 97.2 | 11.2 |
| ash | 9.2 | 2.4 | 74.7 |
| —Na | 0.71 | 0.61 | 24.7 |
| —K | 2.66 | 0.32 | 9.8 |
| —Cl | 1.70 | 0.84 | 44.9 |
| —P | 0.75 | 0.23 | 0.34 |
| —Ca | 0.84 | 0.06 | 0.36 |
| —Mg | 0.14 | 0.00 | 0.00 |

Example 4

The UFR1 of example 1 was concentrated and subjected to monovalent ion removal by nanofiltration over a Synder NFX 3838 NF membrane having MWCO of 150-300 Da. Nanofiltration operated at a temperature between 8 and 20° C., and with a transmembrane pressure of 2 bar and VCF of about 2. The permeate was collected in a flow rate of up to 220 L/h. 108 kg of an UFR1 concentrate as nanofiltration retentate (NFR2) was obtained, together with 149 kg of a nanofiltration permeate (NFP2). Using nanofiltration, the UFR1 is concentrated to a total solid content of about 18%. The composition of the NFR2 product of the nanofiltration is given in table 4.

TABLE 4

Composition of example 4 (in wt % based on total dry weight)

| component | NFR2 |
|---|---|
| protein | 55.6 |
| lactose | 33.4 |
| ash | 7.8 |
| —Na | 0.26 |
| —K | 1.06 |
| —Cl | 0.27 |
| —P | 1.33 |
| —Ca | 1.70 |
| —Mg | 0.12 |

Example 5

The UFR2 of example 2 was concentrated and subjected to monovalent ion removal by nanofiltration over a Synder NFX 3838 NF membrane having MWCO of 150-300 Da. Nanofiltration operated at a temperature between 8 and 20° C., and with a transmembrane pressure of 2 bar. The permeate was collected in a flow rate of up to 400 L/h. 73 kg of an UFR2 concentrate as nanofiltration retentate (NFR3) was obtained, together with 148 kg of a nanofiltration permeate (NFP3). Using nanofiltration, the UFR2 is concentrated to a total solid content of about 18%. The composition of the NFR3 product of the nanofiltration is given in table 5.

TABLE 5

Composition of example 5 (in wt % based on total dry weight)

| component | NFR3 |
|---|---|
| protein | 35.8 |
| lactose | 51.0 |
| ash | 5.6 |
| —Na | 0.35 |
| —K | 0.82 |
| —Cl | 0.26 |
| —P | 0.64 |
| —Ca | 0.66 |
| —Mg | 0.11 |

Example 6

The aim is to produce a mixture with a casein:whey ratio of 40:60. To this end, the UFR1 concentrate of example 4 (NFR2) is mixed with the UFR2 concentrate of example 5 (NFR3) in a weight ratio of 59 kg:87.62 kg (based on a liquid composition) or in a weight ratio of 10.59 kg:16.45 kg (based on a dry composition) respectively, to produce a mixture of UFR1 and UFR2. Besides the in table 6 mentioned constituents, the NFR2/NFR3 mixture comprises NPN at 2.82 wt % and fat at 3.08 wt %.

TABLE 6

Composition of example 6 (in wt % based on total dry weight)

| component | NFR2/NFR3 mixture |
|---|---|
| protein | 43.6 |
| lactose | 44.1 |
| ash | 6.5 |
| —Na | 0.32 |
| —K | 0.91 |
| —Cl | 0.27 |
| —P | 0.91 |
| —Ca | 1.07 |
| —Mg | 0.12 |

Combining the UFR1 concentrate of example 4 (NFR2) with the UFR2 concentrate of example 5 (NFR3) in another selected weight ratio allows to obtain a mixture which comprises casein to whey proteins in a desired ratio that falls within the claimed range. Addition of a softened and optionally concentrated UF permeate (which is substantially free from proteins) allows one to increase the amount of lactose to a desired level. The obtained mixture can be spray-dried into a dry milk formula. For instance, addition of suitable amounts of required nutrients and minerals, where needed, allows one to obtain a growing-up formula with a 40:60 casein to whey protein ratio. Alternative mixtures of UFR1 and UFR2 were made to produce other mixtures of UFR1 and UFR2 that comprised a 50:50 and 60:40 casein to whey ratio.

Example 7

A softened UFP concentrate was recombined with the mixture of UFR1 and UFR2 to produce a composition with a 60:40 casein to whey protein ratio. The softened UFP concentrate was combined with the mixture of UFR1 and UFR2. The UFR1 concentrate of example 4 (NFR2), the UFR2 concentrate of example 5 (NFR3) and the softened UFP concentrate (NFR1) of example 3 are mixed in a weight ratio of 88.51 kg:43.81 kg:188.77 kg (based on a liquid composition) or in a weight ratio of 15.88 kg:8.23 kg:38.57 kg (based on a dry composition) respectively, to produce a mixture of UFR1, UFR2 and softened UFP.

Besides the in table 7 mentioned constituents, the NFR1/NFR2/NFR3 mixture comprises NPN at 1.67 wt % and fat at 1.01 wt %.

TABLE 7

Composition of example 7 (in wt % based on total dry weight)

| Component | NFR1/NFR2/NFR3 mixture |
|---|---|
| Protein | 18.8 |
| Lactose | 74.9 |
| Ash | 4.2 |
| —Na | 0.49 |
| —K | 0.58 |
| —Cl | 0.62 |
| —P | 0.56 |
| —Ca | 0.55 |
| —Mg | 0.05 |

Combining the softened UFP concentrate with the mixture of UFR1 and UFR2 in other selected weight ratios allows obtaining a mixture which comprises casein to whey proteins in a desired ratio that falls within the claimed range. The addition of the softened and optionally concentrated UF permeate (which is substantially free from proteins) allows to increase the amount of lactose to a higher levels as shown. The obtained mixture can be spray-dried into a dry milk formula. For instance, addition of suitable amounts of required nutrients and minerals, where needed, allows one to obtain a growing-up formula with a 60:40 casein to whey protein ratio. Alternative mixtures where made in a similar fashion to obtain compositions that comprised a 50:50 and 40:60 casein to whey ratio.

Example 8

Fractionation of reconstituted skim milk powder (SMP) and reconstituted sweet whey powder (SWP) according to the invention was performed using a combination of unit operations, to prepare three types of infant nutrition base products. Reconstituted SMP and reconstituted SWP were each subjected to UF (step 1), the retentates (UFRs) were subjected to NF (step 2) and the permeates (UFPs) to poly- and monovalent ion removal (step 3). Subsequently, the NF retentates (NFRs) from step 2 and the softened UFPs from step 3 are combined in step 4. The compositions of SMP and SWP are given in table 8. Each step of the process operated in steady state conditions for 4-10 h, during which an acceptable average flux was achieved throughout the entire production sequence. Concentration factors for the membrane filtration steps are given in "mass concentration factor" (MCF), which are calculated in the same way as a VCF, but using weight instead of volume. It can be assumed that MCF=VCF, since all densities are close to that of water (1000 kg/m$^3$) and all solids present in the incoming stream end up in the retentate and permeate streams. Over time, slight variations were observed for the MCFs. Here below, the MCF range is given or the deviation from the given value was less than 10% at all times.

TABLE 8

Compositions of SMP and SWP (per 100 g powder)

| Component | SMP | SWP |
|---|---|---|
| Protein (g) | 35.2 | 13.5 |
| Lactose (g) | 53.3 | 76.6 |
| ash (g) | 7.83 | 8.38 |
| —Na (mg) | 397 | 666 |
| —K (mg) | 1690 | 3040 |
| —Cl (mg) | 979 | 1500 |
| —P (mg) | 1130 | 722 |
| —Ca (mg) | 1260 | 614 |
| —Mg (mg) | 106 | 130 |
| —Zn (mg) | 4.8 | 0.17 |

Step 1: Fractionation of reconstituted SMP and reconstituted SWP was performed using two 3838 10 kDa ultrafiltration membranes in series (Synder Filtration), to separate the feed materials into a protein enriched retentate and a lactose/milk salts enriched permeate at 10° C. The reconstituted skim milk feed material (2800 kg) at a total solids content of 8.64% w/w solid, pH of 6.9 at 5.8° C., was fractionated using a mass concentration factor of 2, while the reconstituted sweet whey feed material (3500 kg) at a total solids content of 6.1% w/w solid, pH of 6.63 at 6.8° C. was fractionated using a mass concentration factor of 5.5 The macronutritional and mineral distribution of the liquid retentate and permeate streams from UF1 and UF2 are presented in table 9. The permeates were collected with an average flux of 10.54 kg/m$^2$/h (for SM) and 20.21 kg/m$^2$/h (for SW).

TABLE 9

Compositions of UFRs and UFPs (per 100 g)

| Component | UFR1 (SM) | UFP1 (SM) | UFR2 (SW) | UFP2 (SW) |
|---|---|---|---|---|
| Total solids (g) | 11.57 | 5.29 | 9.00 | 5.32 |
| Protein (g) | 6.36 | 0.14 | 3.47 | 0.16 |
| Lactose (g) | 4.14 | 4.68 | 4.57 | 4.71 |
| ash (g) | 0.97 | 0.48 | 0.66 | 0.44 |
| —Na (mg) | 38.5 | 34.0 | 38.2 | 32.6 |
| —K (mg) | 162.4 | 142.3 | 117.9 | 99.8 |
| —Cl (mg) | 79.1 | 91.7 | 91.7 | 107.9 |
| —P (mg) | 142.3 | 37.5 | 77.9 | 30.4 |
| —Ca (mg) | 190.5 | 32.8 | 79.1 | 19.2 |
| —Mg (mg) | 13.7 | 6.0 | 10.0 | 6.1 |
| —Mn (mg) | 0.004 | 0.00 | 0.001 | 0.00 |
| —Fe (mg) | 0.042 | 0.10 | 0.051 | 0.072 |
| —Cu (mg) | 0.014 | 0.07 | 0.033 | 0.010 |
| —Zn (mg) | 0.80 | 0.16 | 0.032 | 0.010 |

Step 2: Post ultrafiltration of the reconstituted skim milk and sweet whey powder streams, the subsequent retentates UFR1 and UFR2 were concentrated and partially demineralised using a 3838 150-300 Da nanofiltration (NF) membrane (GEA Filtration, Denmark). For concentration and demineralisation of ~500 kg of UFR1 (pH 6.82 at 6° C.) to 26% w/w solids content, NF1 used two NF membranes in series; while for concentration and demineralisation of ~640 kg UFR2 (pH 5.88 at 6.5° C.) to 28% w/w solids content a single NF membrane was used in NF2. NF1 operated within a mass concentration factor range of 1.8-2.2 while NF2 operated within a mass concentration factor range of 2.6-3. Both NF1 and NF2 were operated within the temperature range of 13-14° C. The permeates were collected with an average flux of 1.64 kg/m$^2$/h (for UFR1) and 9.64 kg/m$^2$/h (for UFR2). The macronutritional and mineral distribution of the liquid retentate and permeate streams from NF1 and NF2 are presented in table 10. The process yielded for NFR1 and NFR2 milk protein concentrate (MPC50) and whey protein concentrate (WPC35) powders respectively.

TABLE 10

Compositions of NFRs and NFPs (per 100 g)

| Component | NFR1 (SM) | NFP1 (SM) | NFR2 (SW) | NFP2 (SW) |
|---|---|---|---|---|
| Total solids (g) | 24.30 | 0.36 | 24.63 | 0.35 |
| Protein (g) | 12.8 | 0.08 | 9.45 | 0.08 |
| Lactose (g) | 9.67 | 0.05 | 13.65 | 0.05 |
| ash (g) | 1.66 | 0.23 | 1.29 | 0.28 |
| —Na (mg) | 51.2 | 23.6 | 51.7 | 52.7 |
| —K (mg) | 222.8 | 92.3 | 168.7 | 156.6 |
| —Cl (mg) | 55.3 | 92.9 | 109.4 | 87.4 |
| —P (mg) | 273.1 | 13.0 | 203.8 | 103.6 |
| —Ca (mg) | 381.2 | 2.02 | 210.6 | 79.0 |
| —Mg (mg) | 27.7 | 0.23 | 26.6 | 24.1 |
| —Mn (mg) | 0.008 | 0.00 | 0.002 | 0.00 |
| —Fe (mg) | 0.061 | 0.00 | 0.12 | 0.019 |
| —Cu (mg) | 0.021 | 0.007 | 0.068 | 0.009 |
| —Zn (mg) | 1.61 | 0.013 | 0.067 | 0.011 |

Step 3: Milk and whey permeates from UF1 and UF2 respectively were concentrated and partially demineralised separately by NF3 using two 3838 150-300 Da nanofiltration (NF) membranes in series (GEA Filtration, Denmark). For concentration and demineralisation ~1000 kg of UFP1 (pH 5.9 at 6.9° C.) was concentrated to 22% w/w solids content. For concentration and demineralisation ~1000 kg of UFP2 (pH 5.6 at 6° C.) was concentrated to 22% w/w solids content. For concentration of both UFP1 and UFP2, NF3 operated within a mass concentration factor range of 3.5-4 at a temperature of 10° C. Average permeate fluxes amounted to 9.73 kg/m$^2$/h (for UFP1) and 10.9 kg/m$^2$/h (for UFP2). The macronutritional and mineral distribution of the liquid retentate and permeate streams from NF3 are presented in table 11.

Post concentration and demineralisation of UFP1 and UFP2 by NF3, both retentates were subsequently indirectly heated to 82° C. using an indirect plate heat exchanger feeding a 250 L jacketed stainless steel vessel. Once the retentate from NF3 was in the storage vessel the pH was adjusted to 7.2 (at 82° C.) using a 30% w/w NaOH solution, causing the precipitation of calcium salts primarily of phosphate and citrate. The precipitated solution was held at 82° C. for 20 minutes to maximise the precipitation reaction followed by cooling to 20° C. using an indirect plate heat exchanger feeding a second 250 L jacketed stainless steel vessel. The precipitated material was removed from the NF3 retentate stream (post precipitation) by UF3 using two 3838 10 kDa ultrafiltration membranes in series (Synder Filtration). UF3 operated within a mass concentration factor of 10 at a temperature of 20° C. The macronutritional and mineral distribution of the liquid retentate streams from UF3 are presented in table 12. The process according to the invention yielded ~50% demineralisation in the UF3 retentates compared to UFP1 and UFP2 on a dry matter basis. The liquid retentate streams from UF3 were combined in a stainless steel vessel at 40° C. The compounded batch (65 kg total mass) constituted the UFR3 from skim milk and the UFR3 from sweet whey in a mass ratio of 20:80 respectively. The batch was subsequently demineralised using a pilot electrodialysis plant (P1 EDR-Y, MemBrain). The endpoint of the demineralisation was determined based on the relationship between conductivity of the demineralised lactose and the ash content therein (endpoint: conductivity<1 mS; ash content<0.75 wt % based on dry matter). Once the endpoint of the demineralisation was reached, the demineralised lactose concentrate stream was cooled to 5° C. followed by determination of total solids content of the ED product as 16.62% w/w.

TABLE 11

Compositions of NFR3s and NFP3s (per 100 g)

| Component | NFR3 (SM) | NFP3 (SM) | NFR3 (SW) | NFP3 (SW) |
|---|---|---|---|---|
| Total solids (g) | 20.67 | 0.32 | 23.55 | 0.42 |
| Protein (g) | 0.33 | 0.09 | 0.37 | 0.09 |
| Lactose (g) | 19.28 | 0.00 | 18.59 | 0.00 |
| ash (g) | 1.07 | 0.24 | 1.08 | 0.30 |
| —Na (mg) | 58.6 | 24.0 | 65.59 | 33.41 |
| —K (mg) | 253.8 | 94.9 | 255.94 | 118.96 |
| —Cl (mg) | 68.0 | 106.9 | 80.05 | 132.15 |
| —P (mg) | 133.4 | 5.68 | 115.36 | 10.61 |
| —Ca (mg) | 125.4 | 1.80 | 100.31 | 1.06 |
| —Mg (mg) | 22.9 | 0.16 | 27.69 | 0.16 |
| —Mn (mg) | 0.0002 | 0.0002 | 0.0002 | 0.000 |
| —Fe (mg) | 0.00 | 0.0005 | 0.0231 | 0.0212 |
| —Cu (mg) | 0.006 | 0.007 | 0.0075 | 0.0078 |
| —Zn (mg) | 0.023 | 0.012 | 0.0402 | 0.016 |

TABLE 12

Compositions of UFRSs and UFP3s (per 100 g)

| Component | UFP3 (SM) | UFP3 (SW) | ED product |
|---|---|---|---|
| Total solids (g) | 17.95 | 19.26 | 16.62 |
| Protein (g) | 0.30 | 0.35 | 0.33 |
| Lactose (g) | 16.78 | 17.98 | 16.17 |
| ash (g) | 0.87 | 0.93 | 0.12 |
| —Na (mg) | 159.9 | 142.2 | 18.4 |
| —K (mg) | 226.7 | 230.3 | 3.0 |
| —Cl (mg) | 64.9 | 79.5 | 2.4 |
| —P (mg) | 66.5 | 71.5 | 19.5 |
| —Ca (mg) | 15.0 | 36.9 | 7.9 |
| —Mg (mg) | 16.3 | 19.8 | 0.0 |
| —Mn (mg) | 0.00 | 0.00 | 0.00 |
| —Fe (mg) | 0.00 | 0.0204 | 0.00 |
| —Cu (mg) | 0.016 | 0.0078 | 0.00 |
| —Zn (mg) | 0.020 | 0.0168 | 0.00 |

Step 4: The final phase in the process was the production of nutritionally balanced infant/toddler nutrition using the materials prepared in the preceding steps (1-3). As such the lactose concentrate solution produced in step 3 (ED product) was used as the liquid stream to which the NFR1 and NFR2 were added, giving the desired (legally required) content and ratio of protein (casein/whey) and lactose for first-stage infant milk (IF), follow on milk (FO) and growing up milk (GUM). The streams were blended in the ratios mentioned in table 13. At this stage the liquid concentrate stream comprising demineralised lactose (from ED product), MPC (from NFR1) and WPC (from NFR2) was pre-heated to 50° C. followed by dosing of oil and GOS to meet the nutritional requirements. The liquid concentrate infant formula streams were then heated treated at 85° C. for 5 min in an indirect tubular heat exchanger (Mircothermics), homogenised downstream from the heat treatment at first and second stage pressures of 125 and 25 bar respectively (at 60° C.), followed by evaporation to 55% w/w solids content in a single effect falling film evaporator, operating at 55° C.; and spray drying using a single stage spray dryer equipped with 2 fluid nozzle atomisation operating at an inlet and outlet temperature of 175° C. and 90° C. respectively. The nutritional composition of the IF, FO and GUM powders produced is outlined in Table 14.

Note that all components mentioned in table 14, except for the fat and part of the carbohydrates (GOS) originate from the skim milk and sweet whey starting materials. All components in table 14 are either within the acceptable ranges for that component, or are below those acceptable ranges. For those components who's content is below acceptable, fortification would be required to increase their content to within acceptable ranges. It is important to note that none of the mentioned components, not even the polyvalent ions, are present above their acceptable range, which would be unacceptable as taking out is impossible, while adding one or a few components may happen straightforward. The possibility of preparing different infant nutritional products, all according to legal standards, demonstrates the versatility and flexibility of the process according to the invention.

TABLE 13

Blending ratios, expressed in kg of liquid concentrate per 100 kg of dry powder

| Streams | IF | FO | GUM |
|---|---|---|---|
| NFR1 (kg) | 43.49 | 55.74 | 56.33 |
| NFR2 (kg) | 61.72 | 47.47 | 47.97 |
| ED product (kg) | 191.83 | 215.90 | 208.86 |

TABLE 14

Compositions of IF, FO and GUM powders (per 100 g)

| Component | IF | FO | GUM |
|---|---|---|---|
| Moisture (g) | 1.26 | 1.68 | 2.38 |
| Protein (g) | 11.5 | 11.69 | 11.56 |
| Carbohydrate (g) | 56.62 | 59.23 | 63 |
| Fat (g) | 28.71 | 25.49 | 21.3 |
| Ash (g) | 1.91 | 1.91 | 1.76 |
| —Na (mg) | 192 | 156 | 171 |
| —K (mg) | 290 | 278 | 240 |
| —Cl (mg) | 88.5 | 83.5 | 109.5 |
| —P (mg) | 310 | 300 | 285 |
| —$SO_4$ (mg) | 36 | 33 | 38 |
| —I (mg) | 37 | 36 | 37 |
| —Se (µg) | 7.7 | 8.4 | 6.7 |
| —Ca (mg) | 354 | 351 | 318 |
| —Mg (mg) | 41 | 39 | 34 |
| —Zn (mg) | 1 | 1.1 | 1.06 |
| Carnite (mg) | 21.3 | 23.6 | 23.8 |
| Choline (mg) | 216 | 231 | 235 |
| Inositol (mg) | 39.9 | 47.4 | 50.4 |
| Biotin (µg) | 10.7 | 11.4 | 11 |
| Folic acid (µg) | 41.4 | 38.8 | 32.1 |
| Pantothenic acid (mg) | 2.31 | 2.88 | 2.84 |
| Vitamin B1 (mg) | 0.17 | 0.17 | 0.17 |
| Vitamin B12 (µg) | 1.38 | 1.39 | 1.29 |
| Bitamin B2 (mg) | 1.23 | 1.2 | 1.27 |
| Vitamin B6 (mg) | 0.1205 | 0.1140 | 0.1288 |

The invention claimed is:

1. A process for treating animal skim milk and sweet whey and/or acid whey, comprising:
    (a) ultrafiltering (UF1) a first liquid composition comprising animal skim milk with 70-90 wt % casein and 10-30 wt % whey proteins, based on total protein, over a first ultrafiltration membrane having a molecular weight cut-off of 2.5-25 kDa using a volume concentration factor of 1.5-6 to obtain a retentate (UFR1) and a permeate (UFP1);
    (b) ultrafiltering (UF2) a second liquid composition comprising sweet whey and/or acid whey over a second ultrafiltration membrane having a molecular weight cut-off of 2.5-25 kDa using a volume concentration factor of 2-15 to obtain a retentate (UFR2) and a permeate (UFP2); and
    (c) mixing the retentates from steps (a) and (b) to obtain a mixture of ultrafiltration retentates.

2. The process according to claim 1, wherein the animal skim milk of the first liquid composition comprises 75-85 wt % casein and 15-25 wt % whey proteins, based on total protein.

3. The process according to claim 1, wherein the sweet and/or acid whey composition of the second liquid composition comprises 0-20 wt % casein and 80-100 wt % whey proteins, based on total protein.

4. The process according to claim 1, further comprising:
    (d) removing polyvalent ions from the UFP1 permeate, the UFP2 permeate, or a mixture of the permeates, to obtain at least one softened permeate, and
    (e) mixing the at least one softened permeate with the UFR1 retentate, UFR2 retentate, and/or the mixture of retentates.

5. The process according to claim 4, further comprising:
    (f) removing monovalent ions from at least one of the softened permeate.

6. The process according to claim 4, further comprising:
    (g) subjecting at least one of the softened permeates to a concentration step, optionally prior to mixing in step (e).

7. The process according to claim 4, wherein the removal of polyvalent ions is accomplished by electrodialysis, ion exchange and/or salt precipitation, and removal of monovalent ions is accomplished by nanofiltration or diafiltration.

8. The process according to claim 4, further comprising:
    (h) drying of the UFR1 retentate, the UFR2 retentate, or the mixture of retentates, optionally before, during or after mixing with the softened UF permeate in step (e), to obtain a dry powder.

9. The process according to claim 8, further comprising:
    (i) sterilizing or pasteurizing the mixture of retentates.

10. The process according to claim 9 further comprising:
    (j1) removing monovalent ion and/or concentrating the UFR1 retentate and/or the UFR2 retentate, prior to step (c), (e) or (h); or
    (j2) removing monovalent ion and/or concentrating the mixture of retentates prior to step (h).

11. The process according to claim 1, wherein the mixture of retentates is further processed into a nutritional product for providing nutrition to infants.

12. The process according to claim 1, an amount of the UFR1 retentate is mixed in step (c) with the UFR2 retentate such that the mixture of retentates has a casein to whey protein weight ratio between 75:25 and 30:70.

13. The process according to claim 4, wherein water which originates from a concentration step is added to the first liquid composition and/or the second liquid composition.

14. The process according to claim 4, wherein the softened UF permeate comprises less than 40% of the polyvalent ions of the UFP1 permeate and/or the UFP2 permeate, on dry weight basis.

15. The process according to claim 4, wherein the softened permeate comprises less than 80% of the monovalent ions of the UFP1 permeate and/or the UFP2 permeate originating from step (b), on dry weight basis, and/or UFR1 retentate comprises less than 80% of the monovalent ions of the UFR1 retentate and/or the UFR2 retentate, on dry weight basis.

16. The process according to claim 1, wherein the second liquid composition comprises at least 50 wt % sweet whey of the total whey, on total weight basis.

17. A process for treating animal skim milk and sweet whey and/or acid whey, comprising:
- (a) ultrafiltering (UF1) a first liquid composition comprising animal skim milk with 70-90 wt % casein and 10-30 wt % whey proteins, based on total protein, over a first ultrafiltration membrane having a molecular weight cut-off of 2.5-25 kDa to obtain a retentate (UFR1) comprising 35-65 wt % proteins and 20-50 wt % lactose, based on dry weight, and a permeate (UFP1) comprising 0-5 wt % proteins and 70-98 wt % lactose, based on dry weight;
- (b) ultrafiltering (UF2) a second liquid composition comprising sweet whey and/or acid whey over a second ultrafiltration membrane having a molecular weight cut-off of 2.5-25 kDa to obtain a retentate (UFR2) comprising 15-55 wt % proteins and 35-65 wt % lactose, based on dry weight, and a permeate (UFP2) comprising 0-5 wt % proteins and 70-98 wt % lactose, based on dry weight; and
- (c) mixing the retentates of steps (a) and (b) to obtain a mixture of retentates.

18. A modular system, comprising:
- (1) a first ultrafiltration (UF) module, comprising:
  - (1a) an inlet for receiving a first liquid composition comprising 70-90 wt % casein and 10-30 wt % whey proteins, based on total protein, to a first side of a first ultrafiltration membrane,
  - (1b) the first ultrafiltration membrane,
  - (1c) a first outlet for discharging an ultrafiltration retentate (UFR1) from the first side of the first ultrafiltration membrane, and
  - (1d) a second outlet for discharging an ultrafiltration permeate (UFP1) from the second side of the first ultrafiltration membrane;
- (2) a second ultrafiltration (UF) module, comprising:
  - (2a) an inlet for receiving a second liquid composition comprising sweet whey and/or acid whey to a first side of a second ultrafiltration membrane,
  - (2b) the second ultrafiltration membrane,
  - (2c) a first outlet for discharging an ultrafiltration retentate (UFR) from the first side of the second ultrafiltration membrane, and
  - (2d) a second outlet for discharging an ultrafiltration permeate (UFP) from the second side of the second ultrafiltration membrane;
- (3) a mixing module, comprising:
  - (3a) a first inlet for receiving the UF retentate originating from the first ultrafiltration module,
  - (3b) a second inlet for receiving the UF retentate originating from the second ultrafiltration module, and
  - (3c) an outlet for discharging a mixture of UF retentates;
- (4) a polyvalent ion removal module, comprising:
  - (4a) an inlet for receiving the UFP originating from the ultrafiltration module (1), receiving the UFP originating from the ultrafiltration module, or a mixture thereof,
  - (4b) means for removing polyvalent ions, and
  - (4c) an outlet for discharging a softened UF permeate; and
- (5) a monovalent ion removal module, comprising:
  - (5a) an inlet for receiving the softened UFP originating from the polyvalent ion removal module to a first side of the nanofiltration membrane,
  - (5b) a nanofiltration membrane,
  - (5c) a first outlet for discharging a nanofiltration retentate (NFR) from the first side of the nanofiltration membrane, and
  - (5d) a second outlet for discharging a nanofiltration permeate (NFP) from the second side of the nanofiltration membrane;

wherein the mixing module further comprises a third inlet for receiving the NF retentate originating from the monovalent ion removal module.

* * * * *